(12) United States Patent
Nakamura et al.

(10) Patent No.: US 12,743,599 B2
(45) Date of Patent: Sep. 22, 2026

(54) IMAGE PROCESSING APPARATUS, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventors: Hironori Nakamura, Kanagawa (JP); Yoshinori Mizoguchi, Tokyo (JP); Akitoshi Yamada, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 269 days.

(21) Appl. No.: 18/638,271

(22) Filed: Apr. 17, 2024

(65) Prior Publication Data

US 2024/0394496 A1 Nov. 28, 2024

(30) Foreign Application Priority Data

May 25, 2023 (JP) ................................ 2023-086426

(51) Int. Cl.
*G06F 15/00* (2006.01)
*G06K 15/02* (2006.01)

(52) U.S. Cl.
CPC ..... *G06K 15/1878* (2013.01); *G06K 15/1822* (2013.01); *G06K 15/1843* (2013.01); *G06K 15/1848* (2013.01)

(58) Field of Classification Search
None
See application file for complete search history.

(56) References Cited

U.S. PATENT DOCUMENTS 8,310,719 B2 * 11/2012 Yabe ...................... H04N 1/407 358/1.9
10,430,684 B2 10/2019 Tanaka
2001/0016077 A1 * 8/2001 Oki ......................... G06T 9/007 382/282
2003/0202196 A1 * 10/2003 Ooki .................. G06K 15/1849 358/1.9
2006/0274341 A1 * 12/2006 Kumada ............ G06K 15/1848 358/1.9
2007/0146774 A1 * 6/2007 Ozawa .................. G06F 3/1214 358/1.15
2022/0114408 A1 * 4/2022 Shindo ................. G06K 15/027
2023/0412751 A1 12/2023 Mizoguchi

FOREIGN PATENT DOCUMENTS

JP 2004-306465 A 11/2004

* cited by examiner

*Primary Examiner* — Mark R Milia
(74) *Attorney, Agent, or Firm* — VENABLE LLP

(57) ABSTRACT

There is provided an image processing apparatus that comprises at least one processor and at least one memory coupled to the at least one processor. The at least one memory stores instructions that, when executed by the at least one processor, cause the at least one processor to generate first bitmap data and second bitmap data different from the first bitmap data based on PDL data, acquire, based on an analysis result of the first bitmap data, a gamut mapping table that associates the second bitmap data with a print color gamut, correct the second bitmap data based on the gamut mapping table, and generate quantized image data based on the corrected second bitmap data.

13 Claims, 15 Drawing Sheets

100
202
207
IMAGE PROCESSING UNIT
211
RENDERER UNIT
212
ANALYSIS UNIT
213
CORRECTION UNIT
214
QUANTIZATION UNIT
215
JPEG ENCODER
216
JPEG DECODER
204
CPU
211a
201
HOST COMPUTER
206
HOST IF CONTROL UNIT
208
HEAD IF CONTROL UNIT
209
HEAD CONTROL UNIT
210
PRINT DATA
205
203
ROM
PDL AREA
INTERMEDIATE DATA AREA
BITMAP DATA AREA
CORRECTION DATA AREA
220
221
222
223
RAM

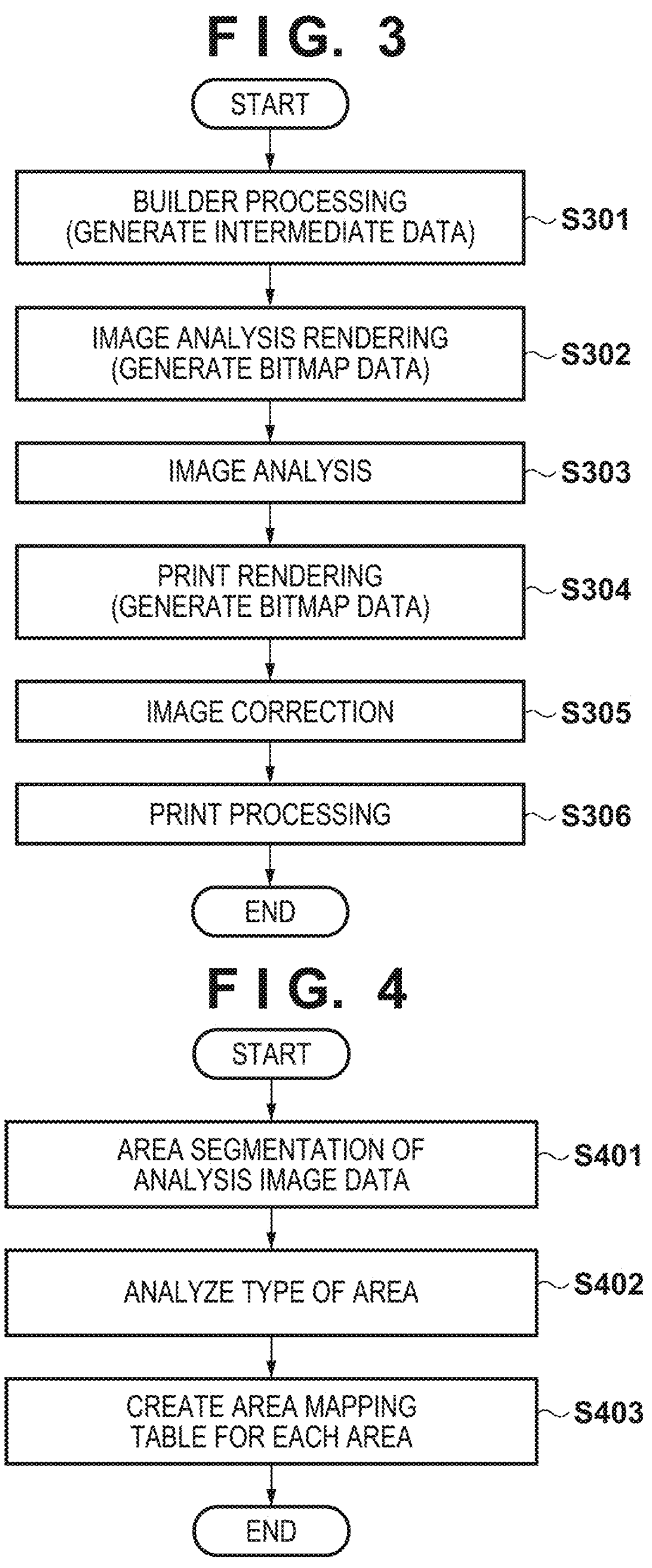
F I G. 3
START
BUILDER PROCESSING
(GENERATE INTERMEDIATE DATA)
S301
IMAGE ANALYSIS RENDERING
(GENERATE BITMAP DATA)
S302
IMAGE ANALYSIS
S303
PRINT RENDERING
(GENERATE BITMAP DATA)
S304
IMAGE CORRECTION
S305
PRINT PROCESSING
S306
END
F I G. 4
START
AREA SEGMENTATION OF
ANALYSIS IMAGE DATA
S401
ANALYZE TYPE OF AREA
S402
CREATE AREA MAPPING
TABLE FOR EACH AREA
S403
END

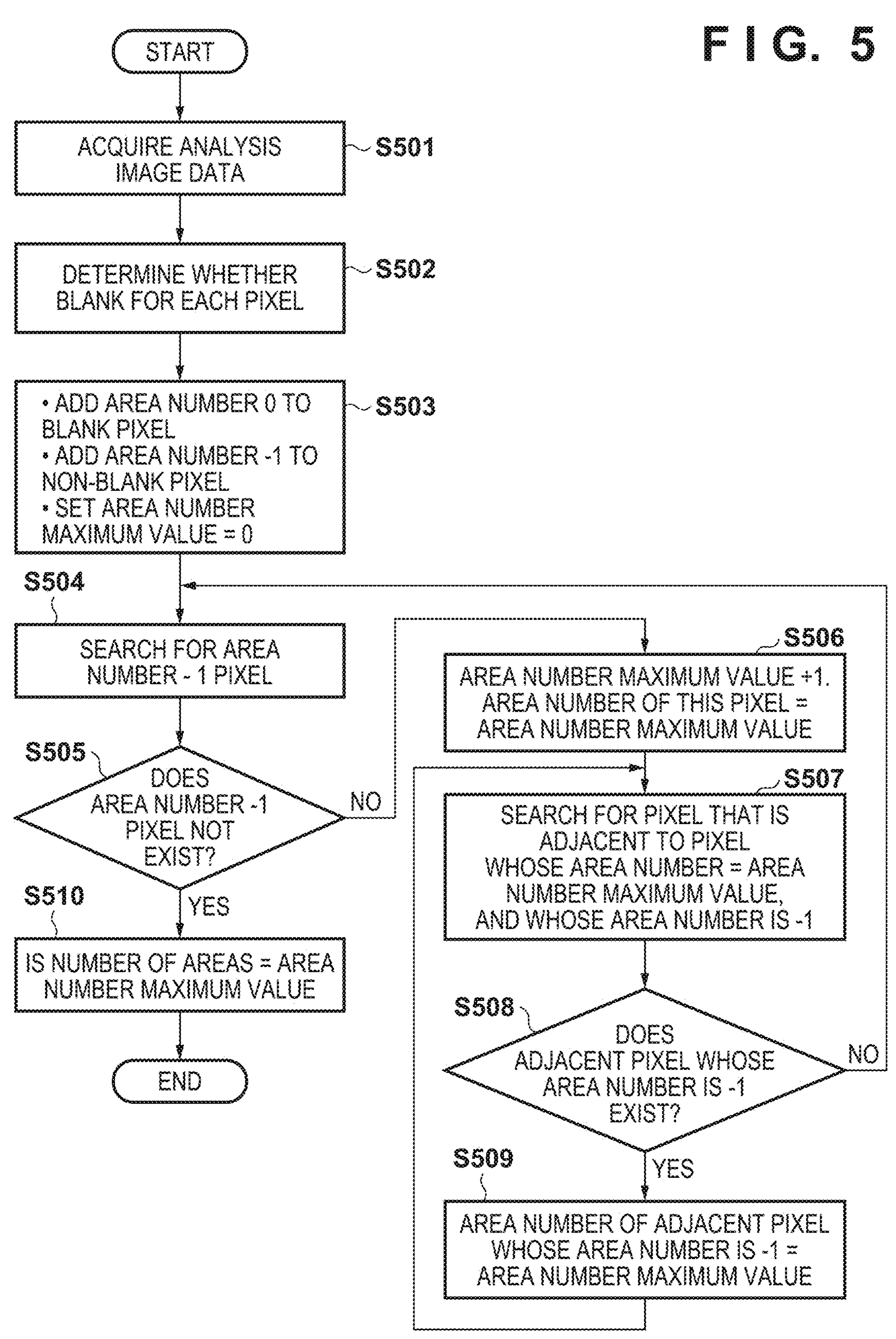
FIG. 5
START
ACQUIRE ANALYSIS IMAGE DATA
S501
DETERMINE WHETHER BLANK FOR EACH PIXEL
S502
• ADD AREA NUMBER 0 TO BLANK PIXEL
• ADD AREA NUMBER -1 TO NON-BLANK PIXEL
• SET AREA NUMBER MAXIMUM VALUE = 0
S503
S504
SEARCH FOR AREA NUMBER - 1 PIXEL
S505
DOES AREA NUMBER -1 PIXEL NOT EXIST?
NO
YES
S506
AREA NUMBER MAXIMUM VALUE +1. AREA NUMBER OF THIS PIXEL = AREA NUMBER MAXIMUM VALUE
S507
SEARCH FOR PIXEL THAT IS ADJACENT TO PIXEL WHOSE AREA NUMBER = AREA NUMBER MAXIMUM VALUE, AND WHOSE AREA NUMBER IS -1
S508
DOES ADJACENT PIXEL WHOSE AREA NUMBER IS -1 EXIST?
NO
YES
S509
AREA NUMBER OF ADJACENT PIXEL WHOSE AREA NUMBER IS -1 = AREA NUMBER MAXIMUM VALUE
S510
IS NUMBER OF AREAS = AREA NUMBER MAXIMUM VALUE
END

DIFFERENT PIXELS

SIMILAR PIXELS

THd

THb

IDENTICAL PIXELS

THa

THc

SIMILAR PIXELS

DIFFERENT PIXELS

TEST

903

904

905

AREA 1

AREA 2

AREA 3

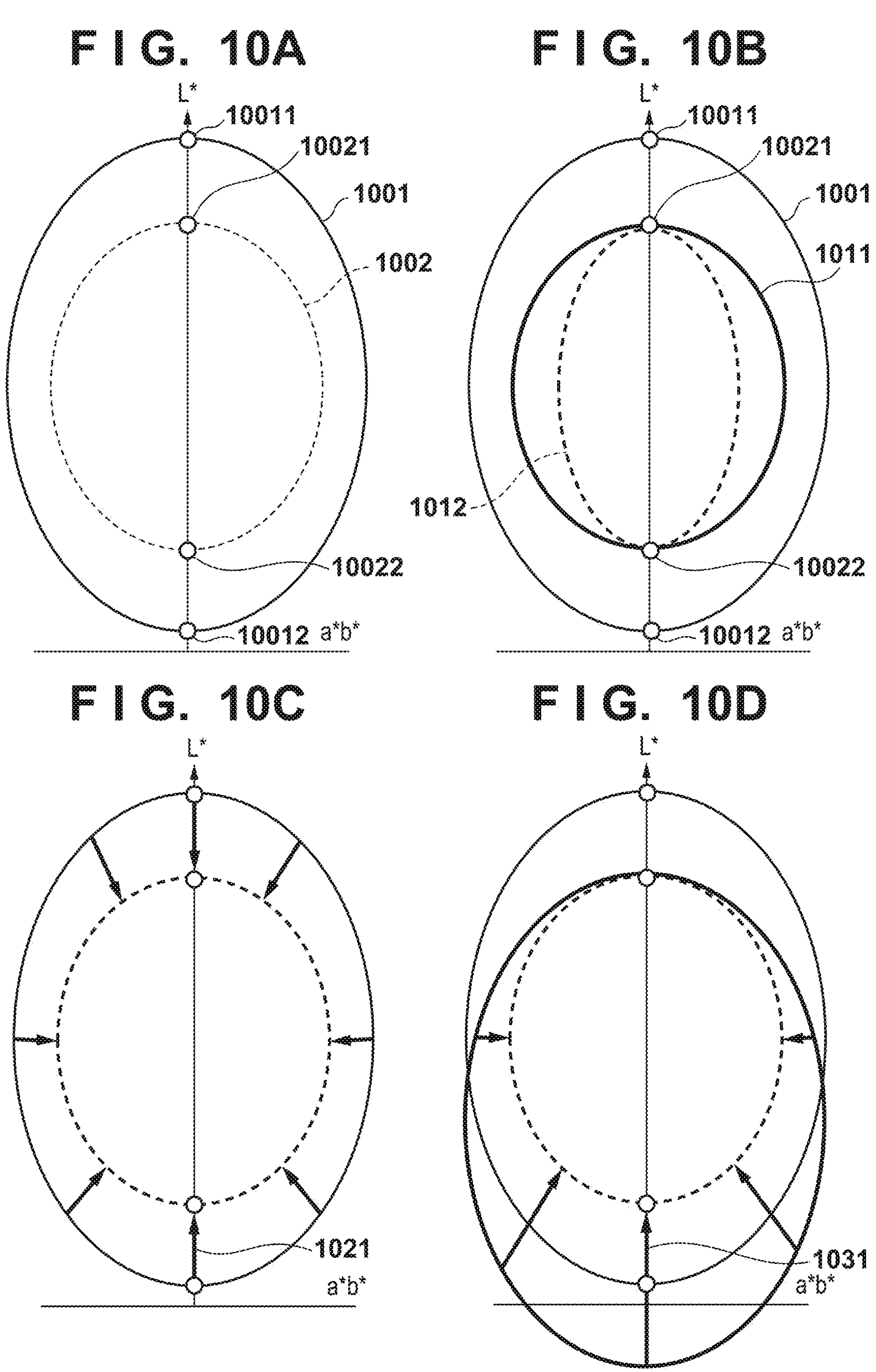
F I G. 10A
L*
10011
10021
1001
1002
10022
10012
a*b*
F I G. 10B
L*
10011
10021
1001
1011
1012
10022
10012
a*b*
F I G. 10C
L*
1021
a*b*
F I G. 10D
L*
1031
a*b*

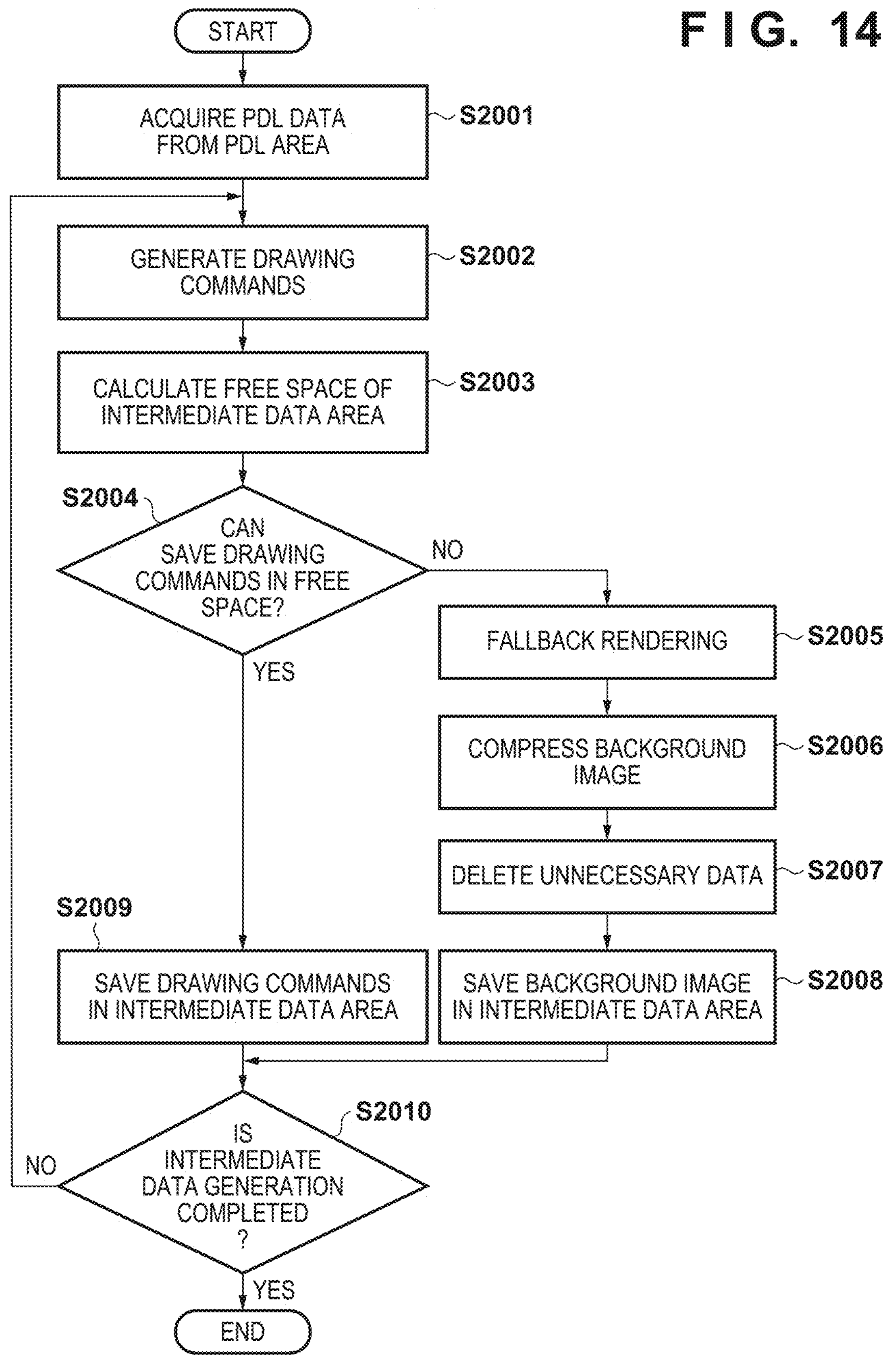

FIG. 14
START
ACQUIRE PDL DATA FROM PDL AREA
S2001
GENERATE DRAWING COMMANDS
S2002
CALCULATE FREE SPACE OF INTERMEDIATE DATA AREA
S2003
S2004
CAN SAVE DRAWING COMMANDS IN FREE SPACE?
NO
YES
FALLBACK RENDERING
S2005
COMPRESS BACKGROUND IMAGE
S2006
DELETE UNNECESSARY DATA
S2007
S2009
SAVE DRAWING COMMANDS IN INTERMEDIATE DATA AREA
SAVE BACKGROUND IMAGE IN INTERMEDIATE DATA AREA
S2008
S2010
IS INTERMEDIATE DATA GENERATION COMPLETED ?
NO
YES
END

| STATE | STATE 1 | STATE 2 | STATE 3 | STATE 4 | STATE 5 |
|---|---|---|---|---|---|
| INTERMEDIATE DATA | FIRST DRAWING COMMAND GROUP | — | SECOND DRAWING COMMAND GROUP | — | THIRD DRAWING COMMAND GROUP |
| | — | FIRST BACKGROUND IMAGE | FIRST BACKGROUND IMAGE | SECOND BACKGROUND IMAGE | SECOND BACKGROUND IMAGE |

IMAGE PROCESSING APPARATUS, IMAGE PROCESSING METHOD, AND NON-TRANSITORY COMPUTER-READABLE STORAGE MEDIUM

BACKGROUND OF THE INVENTION

Field of the Invention

The present invention relates to an image processing apparatus, an image processing method, and a non-transitory computer-readable storage medium.

Description of the Related Art

There is known a printer that receives a digital original described in a predetermined color space, performs, for each color in the predetermined color space, mapping to a color gamut that can be reproduced by the printer, and outputs the original. A plurality of means can be considered as usable for mapping (to be referred to as gamut mapping hereinafter) to the color gamut that can be reproduced by the printer. For example, for a plurality of gamut mapping means from viewpoints of "perceptual" mapping and "absolute colorimetric" mapping, the optimum means changes depending on content information in the original.

There is disclosed a method of acquiring object information in an original from description data in a page description language (to be referred to as PDL hereinafter) and applying an optimum lookup table (to be referred to as an LUT hereinafter) to an object (Japanese Patent Laid-Open No. 2004-306465).

SUMMARY OF THE INVENTION

According to the present invention, it is possible to provide a technique for performing appropriate gamut mapping for an original described in PDL.

Some embodiments of the present disclosure provide an image processing apparatus comprising at least one processor, and at least one memory coupled to the at least one processor. The at least one memory storing instructions that, when executed by the at least one processor, cause the at least one processor to generate first bitmap data and second bitmap data different from the first bitmap data based on PDL data, acquire, based on an analysis result of the first bitmap data, a gamut mapping table that associates the second bitmap data with a print color gamut, correct the second bitmap data based on the gamut mapping table, and generate quantized image data based on the corrected second bitmap data.

Some embodiments of the present disclosure provide an image processing method comprising generating first bitmap data and second bitmap data different from the first bitmap data based on PDL data, acquiring, based on an analysis result of the first bitmap data, a gamut mapping table that associates the second bitmap data with a print color gamut, correcting the second bitmap data based on the gamut mapping table, and generating quantized image data based on the corrected second bitmap data.

Some embodiments of the present disclosure provide a non-transitory computer-readable storage medium storing instructions that, when executed by a computer, cause the computer to perform a method comprising generating first bitmap data and second bitmap data different from the first bitmap data based on PDL data, acquiring, based on an analysis result of the first bitmap data, a gamut mapping table that associates the second bitmap data with a print color gamut, correcting the second bitmap data based on the gamut mapping table, and generating quantized image data based on the corrected second bitmap data.

Further features of the present invention will become apparent from the following description of exemplary embodiments (with reference to the attached drawings).

BRIEF DESCRIPTION OF THE DRAWINGS

FIG. 3 is a flowchart for explaining overall processing of the image processing apparatus according to the first embodiment;

FIG. 4 is a flowchart for explaining image analysis processing in step S303 according to the first embodiment;

FIG. 5 is a flowchart for explaining area segmentation processing in step S401 according to the first embodiment;

FIG. 6E is a view showing an example of an area analysis result in step S402 according to the first embodiment;

FIG. 7 is a flowchart for explaining mapping table creation processing in step S403 according to the first embodiment;

FIG. 10A is a view for explaining mapping;

FIG. 10B is a view for explaining mapping;

FIG. 10C is a view for explaining mapping;

FIG. 10D is a view for explaining mapping;

FIG. 14 is a flowchart for explaining a case where fallback processing occurs in builder processing according to the fourth embodiment; and FIG. 15 is a view for explaining the contents of intermediate data in each state in the processing shown in FIG. 14.

DESCRIPTION OF THE EMBODIMENTS

Figure 1:
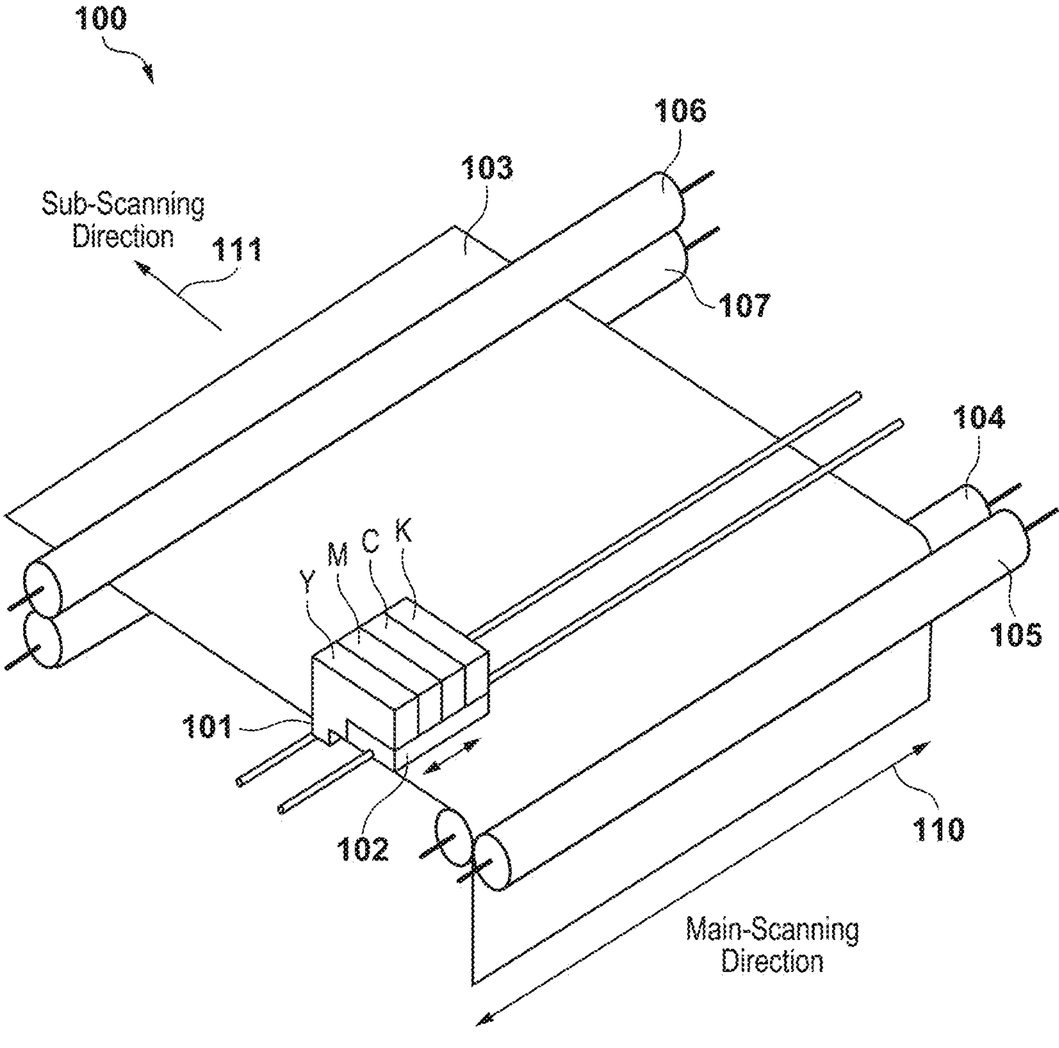
FIG. 1 is a view showing the configuration of a print unit of a serial-type image processing apparatus 100 according to the first embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

FIG. 1 is a view showing the configuration of a print unit of a serial-type image processing apparatus 100 according to the first embodiment.

A printhead unit 101 is mounted on a carriage 102 configured to move in a main-scanning direction 110 at a predetermined speed and discharges ink droplets at a frequency corresponding to the predetermined speed.

A print paper sheet 103 is conveyed by a predetermined amount in a sub-scanning direction 111 every time one print main scanning is ended. At the time of conveyance, the print paper sheet 103 is held by a roller pair of a paper feed roller 104 and an auxiliary roller 105 and a roller pair of a conveyance roller 106 and an auxiliary roller 107. By intermittently repeating such print main scanning and a conveyance operation, an image is printed stepwise on the print paper sheet 103.

In the printhead unit 101, printheads of black (K), cyan (C), magenta (M), and yellow (Y) are arranged in parallel in the main-scanning direction 110, as shown in FIG. 1. In each printhead, a plurality of print elements are arranged in the sub-scanning direction 111.

Figure 2:
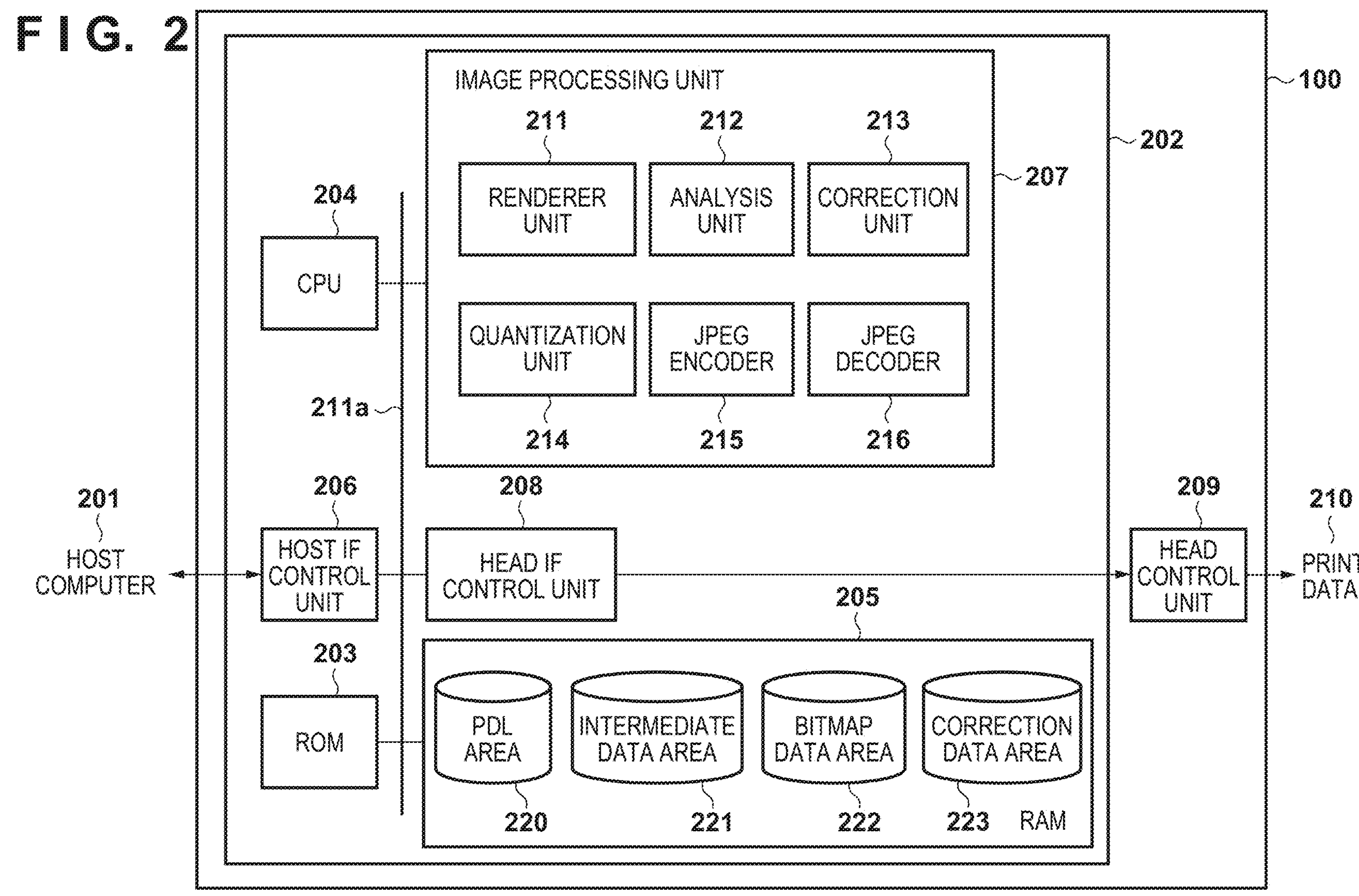
FIG. 2 is a schematic view of a controller unit of the image processing apparatus 100.

FIG. 2 is a schematic view of a controller unit of the image processing apparatus 100.

A host computer 201 is an information processing apparatus (for example, a PC) that creates a print job including page description language (PDL) data and print condition information necessary for printing. Note that the print condition information is information of the type and size of a print paper sheet, print quality, and the like.

A controller 202 is a control device that controls the image processing apparatus 100. The internal configuration of the controller 202 will be described next.

A ROM 203 is a readable memory that stores programs configured to control the image processing apparatus 100.

A CPU 204 controls the image processing apparatus 100 by executing the programs stored in the ROM 203.

A host IF control unit 206 communicates with the host computer 201, receives a print job or the like, and stores the print job or the like in a RAM 205.

The RAM 205 is a readable/writable memory used as a program execution area and a data storage area.

An image processing unit 207 performs quantization processing of generating printable quantized image data from PDL data in the RAM 205 in accordance with print condition included in a print job, and stores the generated quantized image data in the RAM 205. The configurations of the RAM 205 and the image processing unit 207 will be described later.

A head IF control unit 208 transmits the quantized image data in the RAM 205 to a head control unit 209.

The head control unit 209 outputs print data 210 based on information acquired from the controller 202 (head IF control unit 208), and controls the printhead unit 101 to print an image on the print paper sheet 103.

Note that a shared bus 211*a* is connected to the ROM 203, the CPU 204, the RAM 205, the host IF control unit 206, and the image processing unit 207, and the head IF control unit 208. The connected constituent elements can perform communication via the shared bus 211*a*.

Main data processing units and areas of the RAM 205 according to this embodiment will be described.

In the RAM 205, a PDL area 220, an intermediate data area 221, a bitmap data area 222, and a correction data area 223 exist. Other areas also exist in the RAM 205, but a description thereof will be omitted.

The PDL area 220 is an area for holding PDL data of a print job.

The intermediate data area 221 is an area holding intermediate data that the CPU 204 generates from the PDL data.

The bitmap data area 222 is an area for holding bitmap data that a renderer unit 211 generates from the intermediate data.

The correction data area 223 is an area for holding correction value table data generated by an analysis unit 212. The renderer unit 211 reads out intermediate data from the intermediate data area 221, generates bitmap data on a band basis, and stores the bitmap data in the bitmap data area 222. Here, bitmap data indicates information that records an image as continuous pixel values. The number of channels of bitmap data is 1, 3, or 4. The number of bits of bitmap data is 8 or 16. For example, if bitmap data is represented by RGB information, pixel value information may have a sequential data arrangement such as RGBRGBRGB . . . , or a data arrangement such as RRRRR . . . RRGGGGG . . . GGBBBBB . . . BB.

The analysis unit 212 reads out bitmap data from the bitmap data area 222, analyzes it, calculates correction data based on the analysis result, and stores the correction data in the correction data area 223.

A correction unit 213 reads out bitmap data as a print target and correction data for an area of interest from the bitmap data area 222 and the correction data area 223, respectively, and performs bitmap data correction processing using the correction data.

A quantization unit 214 performs quantization processing for the corrected bitmap data, and stores the quantized image data in an area different from the PDL area 220 to the correction data area 223 of the RAM 205.

A JPEG encoder 215 performs JPEG compression for bitmap data under a specific condition. A JPEG decoder 216 performs JPEG decoding for JPEG data under a specific condition.

<Generation of Bitmap Data from PDL Data (Builder Processing and Rendering)>

A method of generating bitmap data from PDL data according to this embodiment will be described. PDL data is data that describes print contents by combining information such as characters and images on a page basis. Without inspecting PDL of one page, which drawing data should be drawn at which position on a page cannot be known. On the other hand, to generate bitmap data at a high speed, a method of processing continuous pixel positions is preferably used. In this method, the memory access efficiency for the RAM 205 is high, and high-speed generation of pixels of identical values can be expected. Hence, PDL is inspected, and as drawing information for enabling easy bitmap data generation, "intermediate data" is generated by processing the PDL data. The method of efficiently generating bitmap data based on intermediate data is generally used. In this embodiment, a process up to intermediate data generation is called "builder processing", and a process up to bitmap data generation is called "rendering". Also, in this embodiment, builder processing is executed by the CPU 204, and rendering is executed by the renderer unit 211. The intermediate data is in a form of executing a drawing command, and it is preferable to generate bitmap data on a raster basis from the top of a page by executing the command from the upper side of intermediate data. Hence, in this embodiment, intermediate data will be explained as information including a drawing command. However, not the intermediate data but any information can be used if it is converted from PDL data to information used by the renderer unit 211 to efficiency execute processing.

FIG. 3 is a flowchart for explaining overall processing of the image processing apparatus according to the first embodiment. By executing processing shown in FIG. 3, areas to which gamut mapping means should be applied are set on analysis image data, and an appropriate gamut mapping means for each area can be selected in accordance with the analysis result of the area.

In step S301, the CPU 204 acquires PDL data from the PDL area 220 of the RAM 205. The CPU 204 performs builder processing of the PDL data, thereby generating intermediate data. The CPU 204 stores the intermediate data in the intermediate data area 221. After generation of whole intermediate data is completed, the CPU 204 deletes the PDL data from the PDL area 220.

In step S302, the CPU 204 reads out the intermediate data in the intermediate data area 221 of the RAM 205, and causes the renderer unit 211 to execute image analysis rendering for the intermediate data. The CPU 204 stores bitmap data (first bitmap data) obtained by rendering in the bitmap data area 222. The bitmap data (image) is generated in the bitmap format, and pixel values corresponding to coordinates can be acquired. In step S302, the intermediate data is rendered with a resolution necessary for image analysis in step S303. When executing image analysis in bitmap data having a print resolution, the processing load is high because the image is analyzed on a pixel basis. Also, in analysis processing that requires judgment from a whole image, bitmap data having the print resolution needs to be held in the RAM 205. Hence, the rendering resolution in step S303 is decided based on characteristics in analysis processing and the required performance of the system. In this embodiment, as an example, the print resolution is set to 600 dpi, and the analysis resolution is set to 150 dpi. However, the present invention is not limited to these.

In step S303, the CPU 204 reads out the bitmap data rendered with the analysis resolution, and executes image analysis of the bitmap data using the analysis unit 212. Details of image analysis processing will be described with reference to FIG. 4.

FIG. 4 is a flowchart for explaining image analysis processing in step S303 according to the first embodiment.

In step S401, using the bitmap data (to be referred to as analysis image data hereinafter) rendered with the analysis resolution, the analysis unit 212 segments the analysis image data into one or a plurality of areas. Details of area segmentation processing will be described later with reference to FIG. 5.

In step S402, the analysis unit 212 executes type analysis for each area based on the information of areas segmented in step S401. Details of area analysis processing will be described later with reference to FIGS. 6A to 6E.

In step S403, the analysis unit 212 creates an appropriate mapping table for each area based on the area information analyzed in step S402 and the pixel values of the areas. The analysis unit 212 stores the created mapping table in the correction data area 223 of the RAM 205. Detailed processing of creating an area mapping table for each area of the analysis image data will be described later with reference to FIG. 7.

FIG. 5 is a flowchart for explaining area segmentation processing in step S401 according to the first embodiment.

In step S501, the CPU 204 acquires analysis image data from the bitmap data area 222.

In step S502, the analysis unit 212 determines, for each pixel of the analysis image data, whether a blank exists. In this embodiment, a pixel whose pixel value is R=G=B=255 is regarded as a blank.

In step S503, the analysis unit 212 sets the initial value of each pixel of the analysis image data based on the following setting conditions.

(Setting Conditions)

Area number "−1" is set for a non-blank pixel

"0" is set to area number maximum value

More specifically, the analysis unit 212 sets the initial value of each pixel as follows.

```
blank pixel (x1, y1) area_number[x1][y1] = 0
non-blank pixel (x2, y2) area_number[x2][y2] = −1
area number maximum value max_area_number = 0
```

When the process of step S503 is completed, the area numbers of all pixels are set to "0" or "−1".

In step S504, based on the following determination conditions, the analysis unit 212 detects a pixel having an area number "−1" in the analysis image data. More specifically, determination is performed as follows.

(Determination Conditions)

```
if(area_number[x][y] = −1) → detected
else → not detected
```

When a pixel having an area number "−1" is detected for the first time, the analysis unit 212 advances the process to step S505.

If it is not determined in step S505 that a pixel having an area number "−1" does not exist in the analysis image data (NO in step S505), the analysis unit 212 advances the process to step S506. On the other hand, upon determining that a pixel having an area number "−1" does not exist in the analysis image data (YES in step S505), the analysis unit 212 advances the process to step S510. Here, a case where it is determined that the area numbers of all pixels are not "−1" is a case where all pixels are blank pixels, or a certain area number (except "−1") is set.

In step S506, the analysis unit 212 increments the area number maximum value by one, and sets the updated area number maximum value to the area number of the pixel. More specifically, for a detected pixel (x3, y3), the area number maximum value is set as follows.

```
max_area_number = max_area_number + 1
area_number[x3][y3] = max_area_number
```

For example, since this is the area detected for the first time after execution of the process of step S506, the area number maximum value is "1", and the area number of the pixel is "1". From then on, the number of areas increases by one every time the process of step S506 is executed again. In steps S507 to S509, processing of expanding continuous non-blank pixels as the same area is performed.

In step S507, the analysis unit 212 searches for a pixel that is adjacent to the pixel having an area number equal to the area number maximum value and has an area number "−1". More specifically, the following determination is performed.

```
if (area_number[x][y] = max_area_number)
if((area_number[x−1][y] = −1) or
area_number[x+1][y] = −1) or
(area_number[x][y−1] = −1) or
(area_number[x][y+1] = −1)) → detected
else → not detected
```

In step S508, when an adjacent pixel having an area number "−1" is detected for the first time, the analysis unit 212 determines that an adjacent pixel having an area number "−1" is detected (YES in step S508), and advances the process to step S509. On the other hand, if the area numbers of all adjacent pixels are not "−1" (NO in step S508), the analysis unit 212 determines that an adjacent pixel having an area number "−1" is not detected (NO in step S508), and returns the process to step S504.

In step S509, the analysis unit 212 sets the area number of the adjacent pixel (the pixel having an area number "−1") to the area number maximum value. More specifically, for the detected adjacent pixel, the analysis unit 212 sets the position of the pixel of interest to (x4, y4) and performs the following processing, thereby setting the area number maximum value.

```
if((area_number[x4−1][y4] = −1)
  area_number[x4−1][y4] = max_area_number
if((area_number[x4+1][y4] = −1)
  area_number[x4+1][y4] = max_area_number
if((area_number[x4][y4−1] = −1)
  area_number[x4][y4−1] = max_area_number
if((area_number[x4][y4+1] = −1)
  area_number[x4][y4+1] = max_area_number
```

After the area number of the adjacent pixel is updated in step S509, the analysis unit 212 returns the process to step S507 and determines whether another adjacent non-blank pixel exists. If no non-blank adjacent pixel exists anymore (that is, if there exists no more pixel to which the maximum area number should be given), the analysis unit 212 returns the process to step S504.

In step S510, the analysis unit 212 sets the area number maximum value as the number of areas. That is, the area number maximum value set so far indicates the number of areas that exist in the analysis image data. Area segmentation processing of the analysis image data is thus ended.

Figures 9A, 9B, 9C:
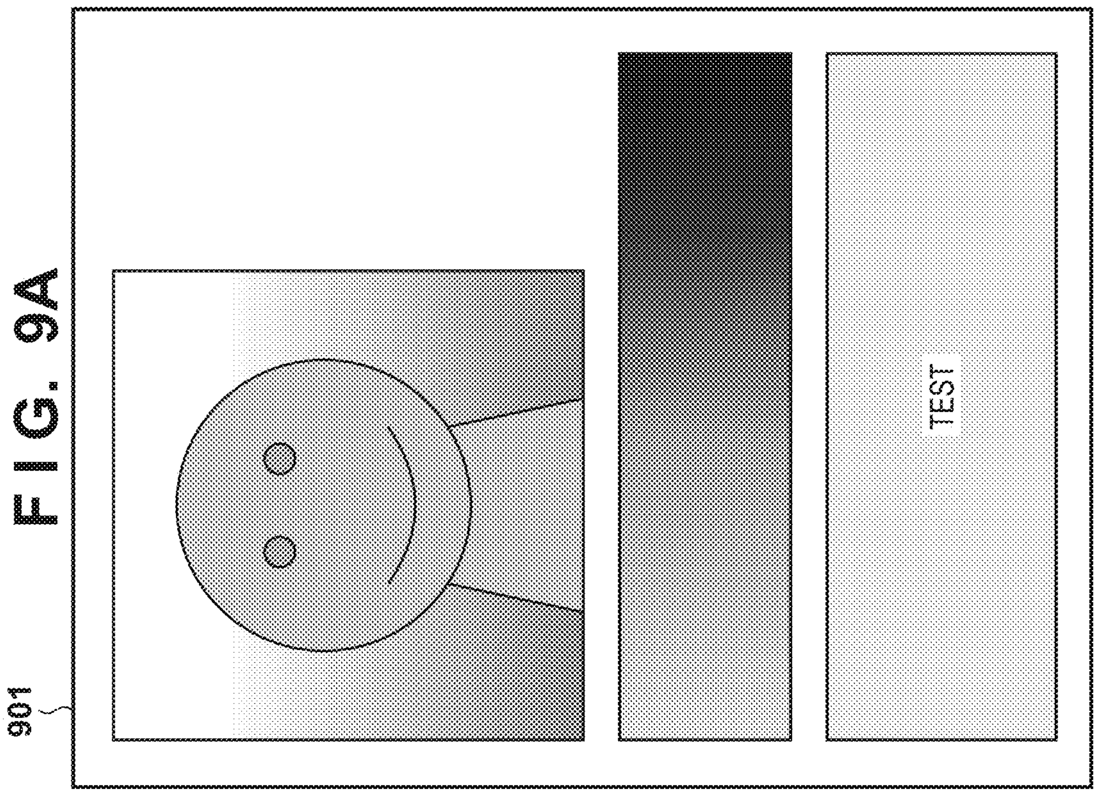
FIG. 9A is a view for explaining the outline of print image data and analysis image data according to the first embodiment.
FIG. 9B is a view for explaining the outline of print image data and analysis image data according to the first embodiment.
FIG. 9C is a view for explaining the outline of print image data and analysis image data according to the first embodiment.

FIGS. 9A to 9C are views for explaining the outline of print image data and analysis image data according to the first embodiment. FIGS. 9A to 9C show print image data 901, analysis image data 902, and the distribution of areas after area segmentation of the analysis image data 902, respectively.

The print image data 901 is image data having a print resolution. The analysis image data 902 is image data having an analysis resolution. An area 903, an area 904, and an area 905 are areas after area segmentation of the analysis image data 902. The area 903 (indicated as area 1) includes data of a photo. The area 904 (indicated as area 2) includes data of a gradation portion. The area 905 (indicated as area 3) includes data of a character portion. Hence, the result of area segmentation of the analysis image data 902 indicates that the number of areas is 3.

As shown in FIG. 9C, the analysis unit 212 (area segmentation means) performs segmentation by providing at least one tile between one area (for example, the area 903) and the other area (for example, the area 904) such that the areas are spatially apart from each other. In other words, the analysis unit 212 determines that a plurality of pixels without a blank tile interposed therebetween are adjacent, and performs area segmentation processing while considering these pixels as the same area.

Note that the analysis unit 212 may execute segmentation processing of the analysis image data 902 using not the above-described method but another method. For example, areas may be segmented using a non-blank pixel as a start point, or areas may be segmented based on not only adjacent pixels but also the tendency values of peripheral pixels in a wider range.

FIGS. 6A to 6E are views showing an example of an area type analysis result in step S402 according to the first embodiment.

Figure 6A:
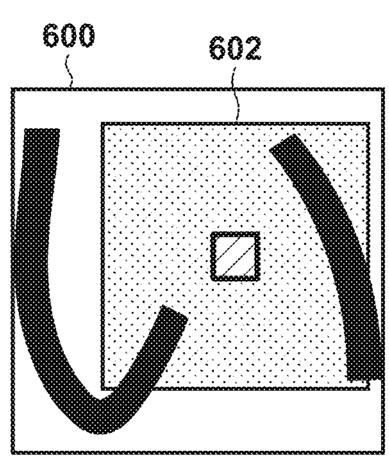
FIG. 6A is a view showing an example of an area analysis result in step S402 according to the first embodiment.

FIG. 6A shows a state in which one area 600 is set for a Japanese character "い" as a result of area segmentation processing in step S401. FIG. 6C shows a state in which one area 601 is set for a circular gradation as a result of area segmentation processing in step S401.

The area 600 or the area 601 is a rectangle surrounding a character or a circular gradation. If the area segmentation method described for step S401 is used, each area is segmented at a boundary to white pixels. Here, for the sake of easier understanding, a rectangular area is set for the result of executing area segmentation in step S401 based on the y-coordinates of a pixel located at the uppermost position and a pixel located at the lowermost position of the area and the x-coordinates of a pixel located at the rightmost position and a pixel located at the leftmost position of the area.

In this embodiment, the presence/absence of an edge in a hatched area is determined using an edge detection area 602 and an edge detection area 603. As a method of determining the presence/absence of an edge, various means can be used. Here, as an example, edge determination processing using "identical pixel", "similar pixel", and "different pixel" is performed.

As shown in FIG. 6E, pixels included in THa to THb are classified into identical pixels, pixels included in THc to THd are classified into similar pixels, and pixels other than these are classified into different pixels. Here, a value to be compared with TH may be RGB information, YCbCr information, or information of one channel, and the number and types of channels are not limited. The values THa to THd may be changed for each color information and, for example, different thresholds may be provided for all RGB values. When all pixels in the edge detection area 602 and the edge detection area 603 are compared with the pixel at the center, how many identical pixels, similar pixels, and different pixels are included in the edge detection area 602 and the edge detection area 603 can be known. The analysis unit 212 scans the edge detection area 602 and the edge detection area 603 wholly, and creates histograms in which the numbers of identical pixels, similar pixels, and different pixels are accumulated. Since the center pixel (indicated by a rectangular area including hatching) of the edge detection area 602 needs to scan the whole area 600, an edge portion of the edge detection area 602 can be a scan target even if it is in the range outside the area 600. Similarly, an edge portion of the edge detection area 603 can be a scan target even if it is in the range outside the area 601.

Figure 6B:
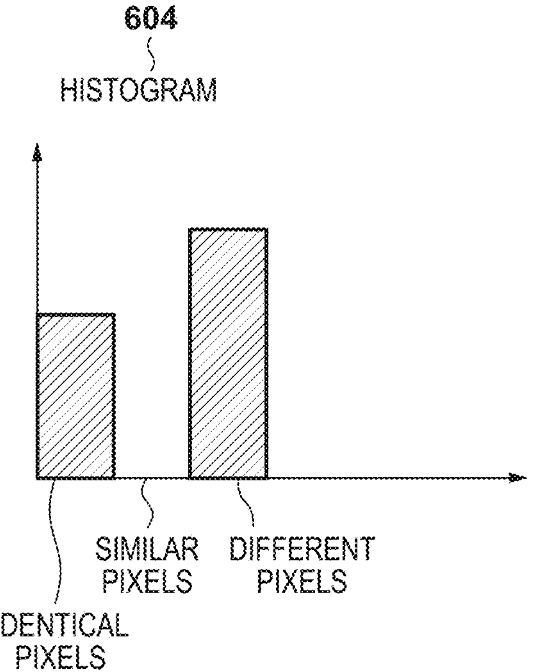
FIG. 6B is a view showing an example of an area analysis result in step S402 according to the first embodiment.
Figure 6C:
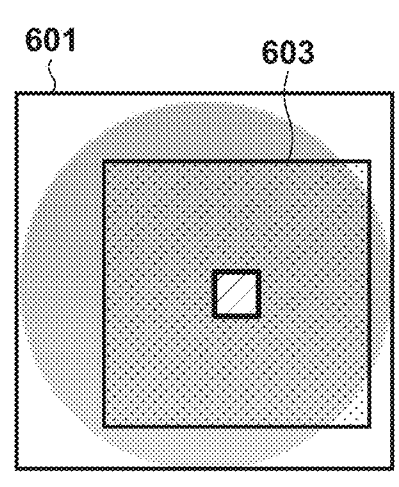
FIG. 6C is a view showing an example of an area analysis result in step S402 according to the first embodiment.
Figure 6D:
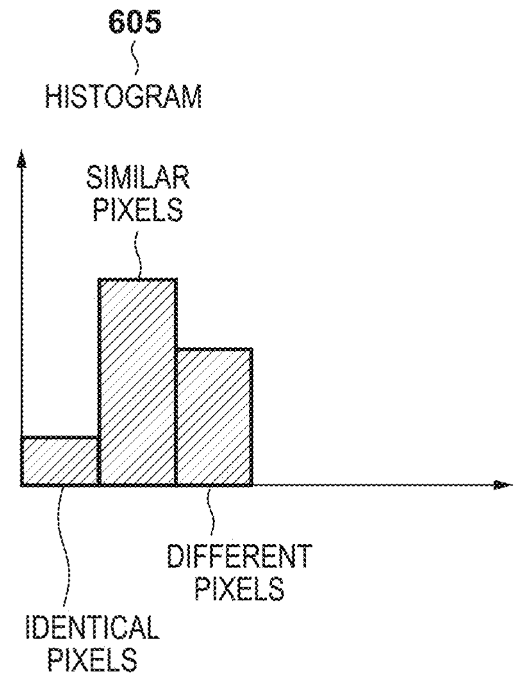
FIG. 6D is a view showing an example of an area analysis result in step S402 according to the first embodiment.
Figure 6E:
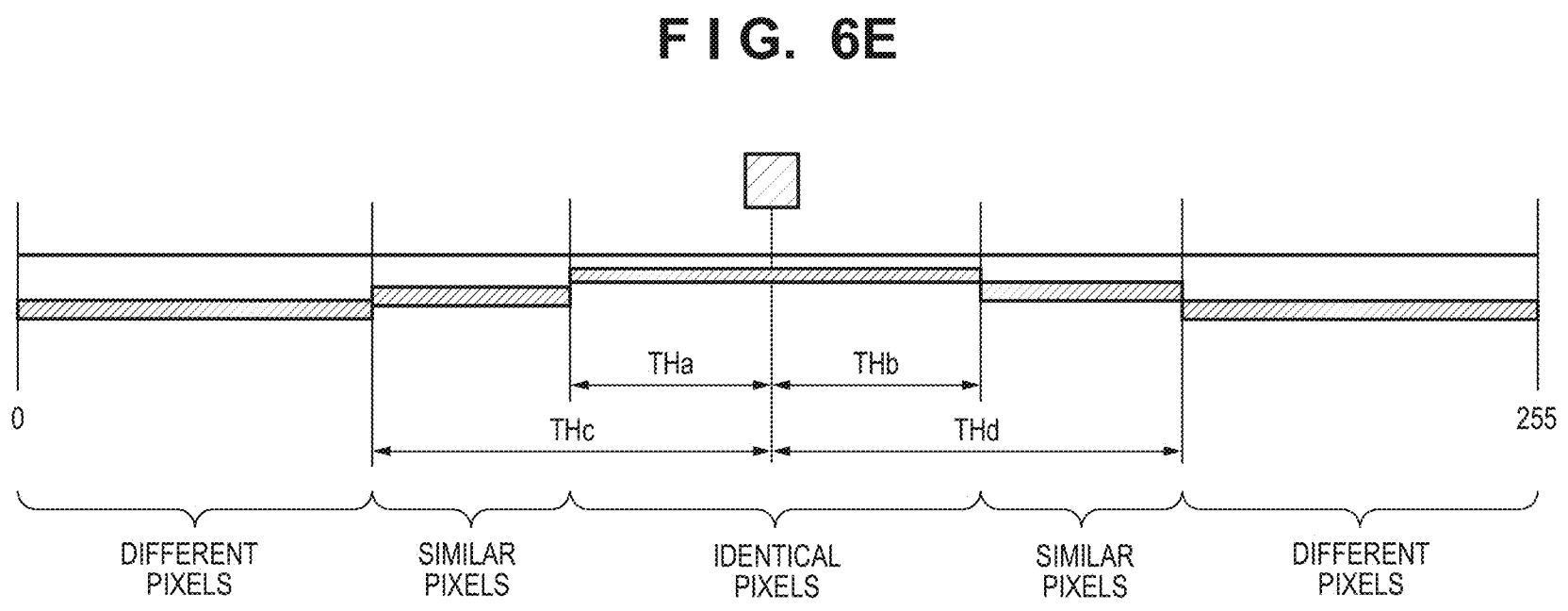

A histogram 604 shown in FIG. 6B indicates a result of performing edge detection processing for the area 600. A histogram 605 shown in FIG. 6D indicates a result of performing edge detection processing for the area 601. According to the frequency distribution of the histogram 604, in the area 600 (including "い") shown in FIG. 6A, there exist many identical pixels and different pixels, and few similar pixels. According to the frequency distribution of the histogram 605, in the area 601 (including a circular gradation) shown in FIG. 6C, the number of similar pixels is larger than in the area 600.

Based on the frequency distributions of the three types of pixels in the histograms 604 and 605, it can be determined which one of "character or graphic" and "photo or gradation" is included in the areas 600 and 601. For example, if the histogram 604 includes few similar pixels, the analysis unit 212 determines that the area 600 includes "character or graphic". By setting a threshold for an identical pixel, a different pixel, and a similar pixel in this way, it can be determined which one of "character or graphic" and "photo or gradation" is included in each area. For example, based on whether the following condition is satisfied, the analysis unit 212 can determine whether each area includes "character or graphic". Based on a result of performing determination for each pixel in each area, the type of pixels frequently distributed in the area may be obtained as a type determination result of the area. For example, if an area has a feature of "picture or graphic" even slightly, the type determination result of the area may be "picture or graphic".

number of identical pixels > $TH_{same}$ && number of similar pixels < $TH_{near}$ && number of different pixels > $TH_{other}$ The above-described edge detection processing is merely an example, and the present invention is not limited to this. For example, the numbers of identical pixels, similar pixels, and different pixels may be compared, using the above-described expression, with a cumulative value obtained by the number of pixels that is the determination result of all pixels. Alternatively, the number of pixels that is the determination result may be converted into the area ratio of the area and compared using the above-described expression. In this embodiment, edge detection processing using the edge detection area 602 and the edge detection area 603 has been described. However, edge detection may be performed using a color distribution in each area.

Figure 7:
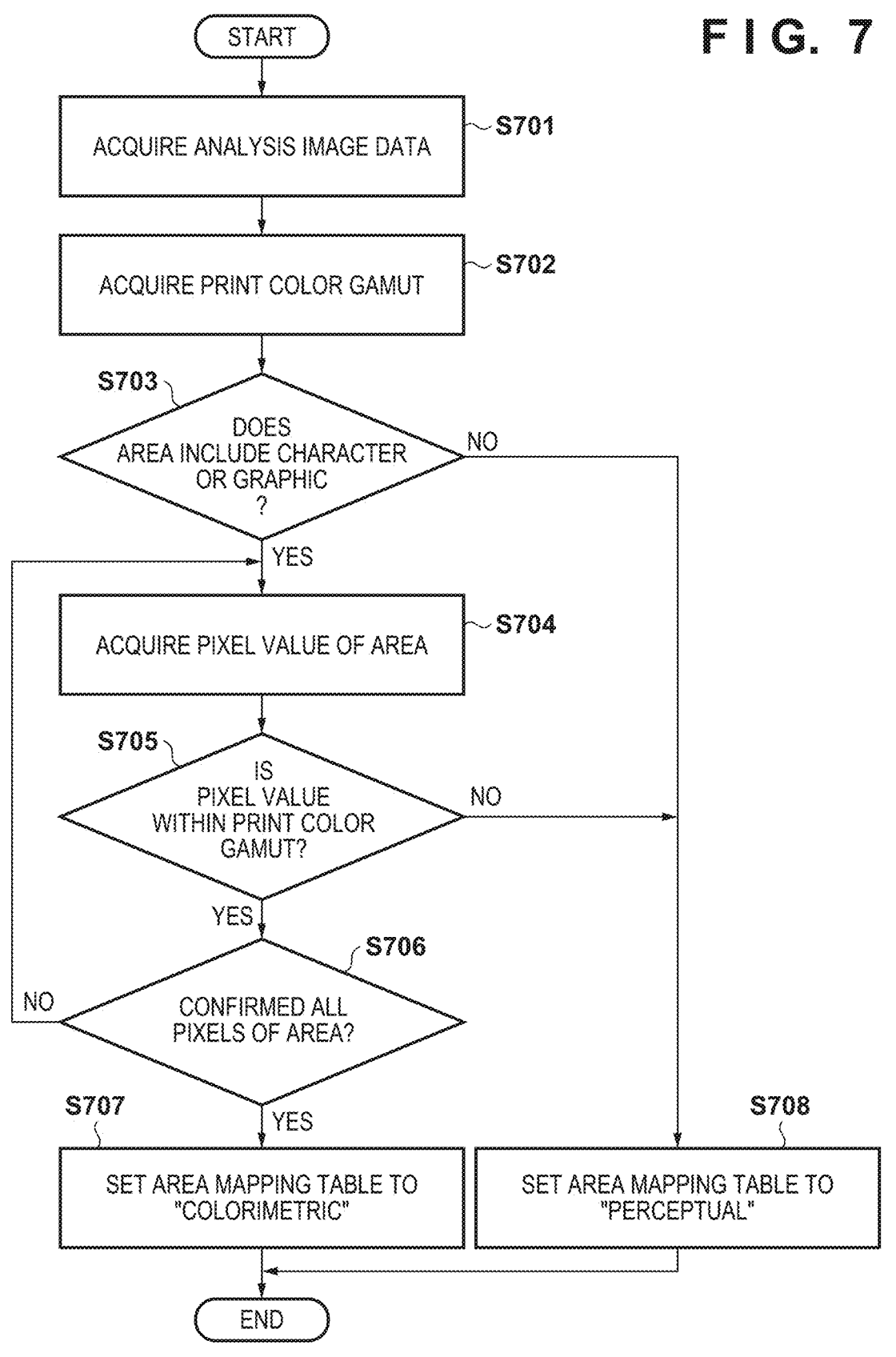

FIG. 7 is a flowchart for explaining mapping table creation processing in step S403 according to the first embodiment.

In step S701, the CPU 204 acquires analysis image data from the bitmap data area 222.

In step S702, the analysis unit 212 acquires a print color gamut necessary for creating a mapping table. The print color gamut is information representing the range of colors reproduceable in printing of the printer, and changes depending on the print paper sheet (plain paper or photo paper) and the print mode (draft, standard, fine, and the like). In general, the print color gamut is wider in printing on photo paper than in printing on plain paper. The print color gamut becomes wider in the order of the draft mode, the standard mode, and the fine mode. This is because the larger the ink amount used for printing is, and the larger the amount of ink existing on the print paper sheet surface in the printed ink is, the better color development of the print result is.

Various methods can be used as the print color gamut expression method. For example, a method of expressing the print color gamut by lightness (L), chroma (C), and hue (H) is used. More specifically, the print color gamut expression method is a method of describing the maximum chroma with respect to each lightness and hue, and is a method using a table expressed below.

$$\text{Cmax\_Table}[L][H]\ (L = 0 \text{ to } 100,\ H = 0 \text{ to } 360)$$

Here, since 101 L values and 360 H values exist, the number of pieces of C information is 36,360 (=101×360). Note that to decrease the capacity of the mapping table, the tones of L and H may be reduced.

For example, the print color gamut may be stored in the ROM 203 of the printer, and the CPU 204 reads out the print color gamut in the ROM 203. The print color gamut is decided in advance as the performance of the printer (printing apparatus), as described above. Hence, for example, a print patch is printed in advance using RGB values, and the maximum chroma with respect to each lightness and hue is set based on the measurement result of the print patch.

In step S703, the analysis unit 212 determines, based on the are analysis result in step S402, whether an area of the analysis image data includes "character or graphic". Upon determining that the area includes "character or graphic" (YES in step S703), the analysis unit 212 advances the process to step S704. Upon determining that the area does not include "character or graphic" (NO in step S703), the analysis unit 212 advances the process to step S708.

In step S704, the analysis unit 212 acquires the pixel value of one pixel in the area of the analysis image data.

In step S705, the analysis unit 212 determines whether the pixel value acquired in step S704 exists in the print color gamut acquired in step S702. More specifically, the analysis unit 212 converts the RGB value that is the acquired pixel value into lightness, chroma, and hue. Since a general RGB value is an sRGB value, in this embodiment, a description will be made using an sRGB value as an example. For example, a conversion table SRGBtoLCH[Rin][Gin][Bin][0 to 2] that converts the sRGB value into lightness, chroma, and hue is stored in advance in the ROM 203 of the printer. The analysis unit 212 calculates Lin, Cin, and Hin using the sRGB value as follows.

Lin = sRGBtoLCH[Rin][Gin][Bin][0]
Cin = sRGBtoLCH[Rin][Gin][Bin][1]
Hin = sRGBtoLCH[Rin][Gin][Bin][2]

The analysis unit 212 performs comparison processing represented by the following expression and determines whether Lin, Cin, and Hin exist in the print color gamut.

If(Cin <= Cmax_Table[Lin][Hin]) → within print color gamut
Else → outside print color gamut Upon determining that Lin, Cin, and Hin exist in the print color gamut (YES in step S705), the analysis unit 212 advances the process to step S706. On the other hand, upon determining that Lin, Cin, and Hin do not exist in the print color gamut (NO in step S705), the analysis unit 212 advances the process to step S708.

In step S706, the analysis unit 212 determines whether determination of all pixels in the area is ended. Upon determining that determination of all pixels in the area is ended (YES in step S706), the analysis unit 212 advances the process to step S707. On the other hand, upon determining that determination of all pixels in the area is not ended (NO in step S706), the analysis unit 212 returns the process to step S704 and performs the above-described processing for the next pixel in the partial page.

In step S707, the analysis unit 212 sets a "colorimetric" mapping table as the mapping table of the area, and ends the processing. Setting of the "colorimetric" mapping table will be described later with reference to FIGS. 10C and 10D. A case where the process of step S707 is performed is a case where all pixels in the area exist within the print color gamut. For this reason, if the "colorimetric" mapping table is used for an area formed by a plurality of colors within the reproduction color gamut of the printer, lowering of a color difference does not occur in the area.

In step S708, the analysis unit 212 sets a "perceptual" mapping table as the mapping table of the area, and ends the processing. Setting of the "perceptual" mapping table will be described later with reference to FIG. 10B. A case where the process of step S708 is performed is a case where a pixel outside the print color gamut exists among the pixels in the area. For this reason, if the "colorimetric" mapping table is used for an area formed by a plurality of colors outside the reproduction color gamut of the printer, lowering of a color difference may occur in the area. Another condition that the process of step S708 is performed includes a case where the area includes "photo or gradation". "Photo or gradation" often has a characteristic that the pixel tone moderately changes, and lowering of tonality that may occur in use of the "colorimetric" mapping table may occur for the area as well. Hence, in step S708, the analysis unit 212 sets a "perceptual" mapping table as the mapping table of the area.

FIGS. 10A to 10D are views for explaining mapping.

FIG. 10A is a view showing the relationship between the color space of a standard display and the color space of a printer. That is, a solid line 1001 in FIG. 10A indicates an sRGB color space defined as IEC 619662-1: 1999 in the L*a*b* uniform color space. Also, the solid line 1001 indicates a color space that original data (PDL data) from the host computer 201 can take. A print color gamut 1002 (indicated by a broken line) in FIG. 10A is the color reproduction range of the printer.

When a color displayed on the standard display is output by the image processing apparatus 100, a color outside the color reproduction range of the image processing apparatus 100 needs to be associated with an appropriate color in the reproduction range. This associating is generally called color space compression (color mapping). In general, there exist a plurality of color space compression methods, and these are selectively used in accordance with the purpose. In FIG. 10A, a WP 10011 and a WP 10021 indicate the brightest colors (WP: white point) in the reproduction ranges of the standard display and the printer, respectively. In addition, a BP 10012 and a BP 10022 indicate the darkest colors (BP: black point) in the reproduction ranges of the standard display and the printer, respectively.

FIG. 10B is a view for explaining "perceptual" mapping. As indicated by a thick solid line 1011 in FIG. 10B, the white point (WP 10011) and the black point (BP 10012) of the standard display are mapped to the white point (WP 10021) and the black point (BP 10022) of the printer. The remaining colors are converted such that the correlation relationship between the white points and the black points is maintained. The entire color space 1001 of the standard display is converted to be fitted in the print color gamut 1002 of the printer (to convert chroma on the color direction). Hence, colors in the color space 1001 of the standard display are converted into a thick solid line 1011, and colors on the original print color gamut 1002 are converted into a thick broken line 1012. The "perceptual" mapping shown in FIG. 10B is suitable for processing of photos including many colors. As shown in FIG. 10B, the color gamut of the standard display is compressed concerning both lightness and chroma.

FIG. 10C is a view for explaining absolute colorimetric mapping. As shown in FIG. 10C, this is a method of not performing compression for colors in the print color gamut of the printer and performing compression concerning both lightness and chroma for colors outside the print color gamut. Thick arrows 1021 in FIG. 10C represent the directions of compression processing of colors. A plurality of colors included in the areas of the thick arrows 1021 are expressed as different colors on the standard display but, after mapping, are the same colors at the end points of the arrows.

FIG. 10D is a view for explaining relative colorimetric mapping. As shown in FIG. 10D, only the white point of the standard display is mapped to the white point of the printer. After that, without performing compression for colors in the print color gamut of the printer, color compression processing concerning both lightness and chroma is performed for colors outside the print color gamut. "Relative colorimetric mapping" can reproduce the relative color difference between each color and the white color of the standard display can be reproduced as the relative color difference between each color and paper white in printing. In FIG. 10D, a plurality of colors included in the areas of thick arrows 1031 are expressed as different colors on the standard display but, after mapping, are the same colors at the end points of the arrows.

Note that also usable is a method of mapping the white point and the black point of the standard display to the white point and the black point of the printer, respectively, and after that, performing chroma compression for colors outside the print color gamut without performing compression for colors in the print color gamut of the printer. As the "colorimetric mapping" set in step S707 in FIG. 7, the "absolute colorimetric mapping" described using FIG. 10C and the "relative colorimetric mapping" described using FIG. 10D can be used. However, other methods may be used. If the "relative colorimetric mapping" and other methods are used, mapping to the white point and the black point needs to be performed before the process of step S705. More specifically, in FIG. 10D (mapping of only the white point is performed), letting Lmax (the range of Lis 0 to 100) be the L value of the white point in the print color gamut of the printer, determination is performed as follows.

```
Lin2 = Lin − (100 − Lmax)
If(Cin <= Cmax_Table[Lin2][Hin]) → within print color gamut
Else   → outside print color gamut
```

When performing mapping of both the white point and the black point, let Lmax (the range of L is 0 to 100) be the L value of the white point in the print color gamut of the printer, and Lmin be the L value of the black point. In this case, determination is performed as follows.

```
Lin2 = (Lmax − Lmin)*Lin/100 + Lmin
If(Cin <= Cmax_Table[Lin2][Hin]) → within print color gamut
Else   → outside print color gamut
```

As described above, it is possible to select an appropriate mapping method for each area of the analysis image data. That is, "perceptual" mapping is set for an area including color information outside the print color gamut and an area including "photo or gradation", and "colorimetric" mapping is set for an area that does not include color information outside the print color gamut. This makes it possible to perform mapping that reduces lowering of chroma for a digital original formed by colors reproduceable by the printer. It is also possible to perform mapping that reduces lowering of the color difference between colors for a digital original formed by a plurality of colors outside the print color gamut of the printer. Return to the explanation of FIG. 3.

In step S304, the CPU 204 reads out the intermediate data from the intermediate data area 221, and executes print rendering for the intermediate data using the renderer unit 211, thereby generating bitmap data (second bitmap data). The CPU 204 stores the bitmap data in the bitmap data area 222. The image obtained by rendering the intermediate data is generated in the bitmap format, and the CPU 204 can acquire pixel values corresponding to coordinates. In step S304, the intermediate data is rendered with a resolution necessary for printing. If the rendering processing is completed using whole information of the intermediate data, the CPU 204 deletes the intermediate data from the intermediate data area 221.

In step S305, the correction unit 213 corrects the bitmap data (to be referred to as print image data hereinafter) rendered with the print resolution using a gamut mapping table in the correction data area 223. Correction processing of the print image data will be described in detail with reference to FIG. 8.

Figure 8:
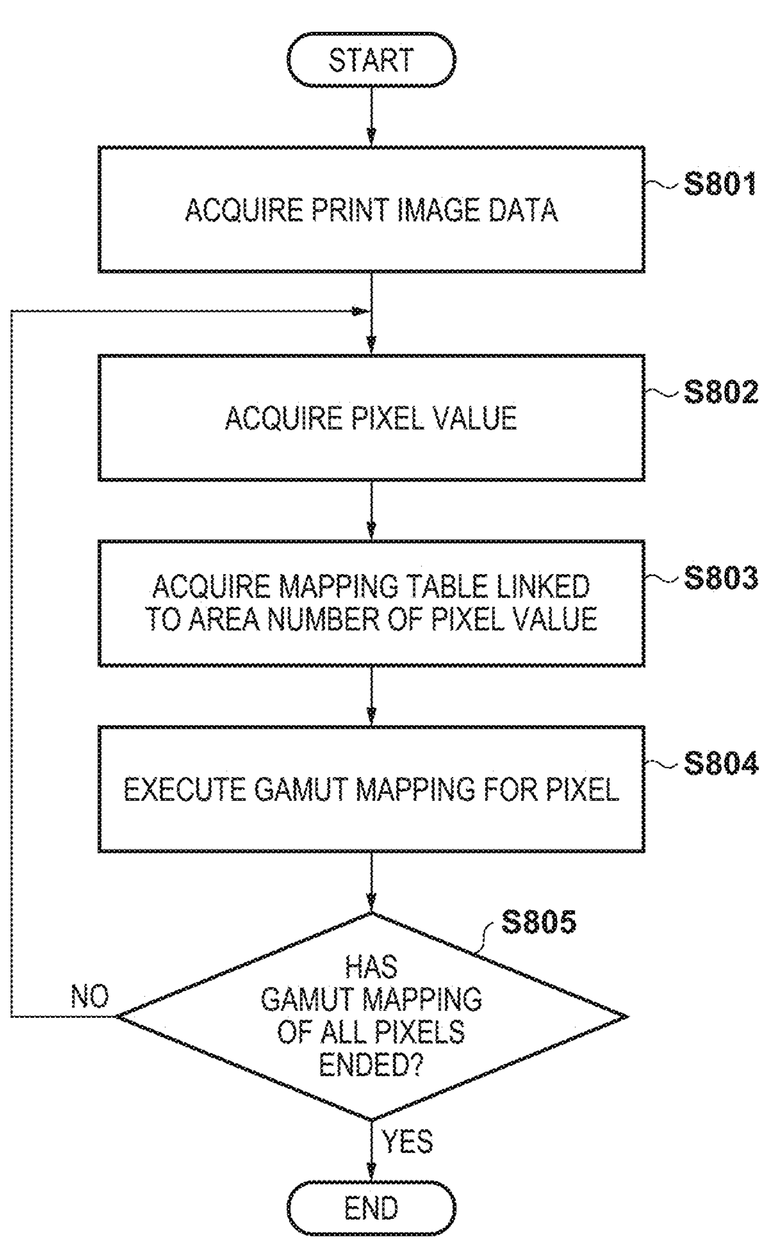
FIG. 8 is a flowchart for explaining print image data correction processing in step S305 according to the first embodiment.

FIG. 8 is a flowchart for explaining print image data correction processing in step S305 according to the first embodiment.

In step S801, the CPU 204 acquires print image data from the bitmap data area 222.

In step S802, the correction unit 213 acquires the pixel value of one pixel from the print image data.

In step S803, the correction unit 213 acquires, from the correction data area 223, a mapping table linked with an area number corresponding to the acquired pixel value. If the resolution of the analysis image data and that of the print image data are different, the pixel value needs to be associated in consideration of the difference between the resolutions. For example, assume that the resolution of the analysis image data is 150 dpi, and the resolution of the print image data is 600 dpi. In this case, each pixel of the analysis image data is enlarged to 4×4 pixels and assigned to the print image data. Even in a case where the resolution of the analysis image data is low, if a drawing command is interpreted at the time of rendering, and rendering to a low resolution is performed, a non-blank pixel does not disappear at the time of reduction. Hence, a corresponding area of the print image data can be covered by enlarging the analysis result (analysis image data). On the other hand, a pixel value is directly described in the drawing command in some cases. In this case, it is considered that a pixel disappears if rendering is performed with a reduction resolution. Hence, the numerical value of the reduction resolution can be set depending on how accurately a user want an image to be converted and a required speed.

In step S804, the correction unit 213 executes gamut mapping for the target pixel using the corresponding gamut mapping table.

In step S805, the correction unit 213 determines whether gamut mapping processing of all pixels is ended. Upon determining that the determination of all pixels is ended (YES in step S805), the correction unit 213 ends the processing. On the other hand, upon determining that the determination of all pixels is not ended (NO in step S805), the correction unit 213 returns the process to step S802 and performs the above-described processing for the next pixel.

The image correction means is not limited to that described above. For example, after colorimetric gamut mapping is performed for all pixels to which "colorimetric" gamut mapping is preferably applied in the print image data, perceptual gamut mapping may be performed for all pixels to which "perceptual" gamut mapping is preferably applied. In this case, gamut mapping table loading processing can be reduced, and the processing efficiency improves.

In step S306, the CPU 204 performs predetermined processing for the print image data corrected in step S305. More specifically, the CPU 204 performs processes of ink color separation, output characteristic conversion, and quantization for each pixel of the corrected print image data using the quantization unit 214. The CPU 204 stores, in the RAM 205, the image data that has undergone quantization. The head control unit 209 reads out the quantized image data via the head IF control unit 208, and outputs the quantized image data (information for enabling discharge of ink droplets) to the printhead unit 101, thereby starting printing.

As described above, in the first embodiment, analysis processing is executed using analysis image data generated by performing rendering for intermediate data obtained by builder processing of PDL data. Since the analysis image data has a minimum resolution necessary for analysis processing, the memory size can be suppressed. Since a stable analysis result can be obtained, independently of an external application, by analyzing the analysis image data, it is possible to select gamut mapping at a grain size different from PDL (description language).

Second Embodiment

In the second embodiment, differences from the first embodiment will be described. In the first embodiment, PDL data is converted into intermediate data by builder processing. By holding the intermediate data, rendering processes of resolutions for analysis and printing are implemented. In the first embodiment, the processing speed is satisfied by executing image analysis at an appropriate resolution in the image processing apparatus 100, and a stable analysis result independent of an external application can be obtained. In the second embodiment, a configuration for holding data not as intermediate data but in the PDL data format will be described.

Figure 11:
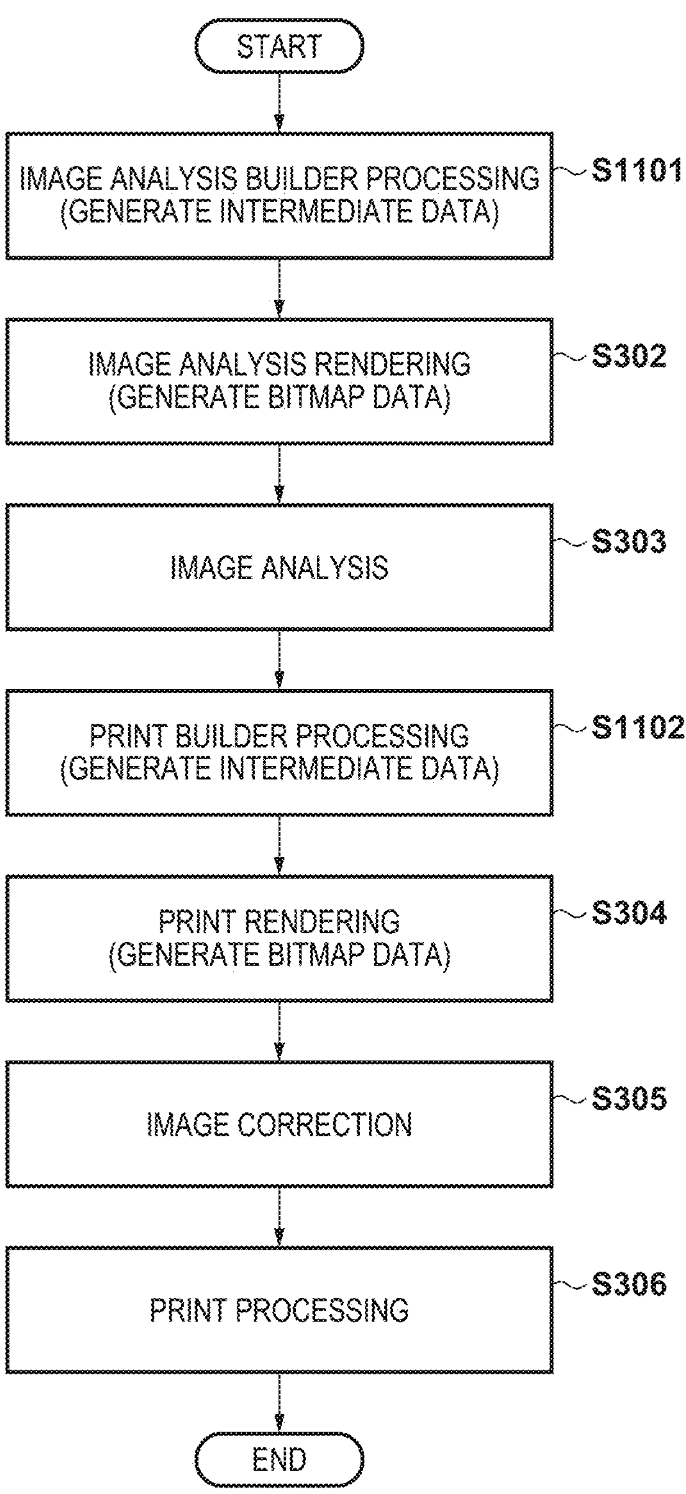
FIG. 11 is a flowchart for explaining overall processing of an image processing apparatus according to the second embodiment.

FIG. 11 is a flowchart for explaining overall processing of an image processing apparatus according to the second embodiment. Note that in the second embodiment, differences from the first embodiment will be described.

In step S1101, a CPU 204 acquires, from a PDL area 220, PDL data transmitted by an application. The CPU 204 interprets the PDL data by builder processing, thereby generating intermediate data. Here, the CPU 204 does not delete the PDL data from the PDL area 220 and holds it.

In step S302, the CPU 204 executes image analysis rendering based on the intermediate data. In step S302, rendering of the intermediate data is performed with a resolution necessary for image analysis in step S303. If the intermediate data is saved in an intermediate data area 221 in step S1101, it is deleted at the end of rendering.

In step S1102, the CPU 204 acquires the PDL data from the PDL area 220. The CPU 204 interprets the PDL data by builder processing, thereby generating intermediate data. After generation of the intermediate data, the CPU 204 deletes the PDL data from the PDL area 220.

In step S304, the CPU 204 executes print rendering based on the intermediate data. In step S304, rendering is performed with a resolution necessary for image correction in step S305. If the intermediate data is saved in the intermediate data area 221 in step S1102, it is deleted at the end of rendering.

The difference from the first embodiment is that data held during image analysis processing is not the intermediate data in the intermediate data area 221 but the PDL data in the PDL area 220.

In the second embodiment, the PDL data is held in a memory (RAM 205), and rendering for the PDL data is executed twice in total in image analysis and printing. As compared to the first embodiment, the second embodiment has an effect of further suppressing the memory size because not intermediate data but PDL data is held.

Third Embodiment

In the third embodiment, differences from the first and second embodiments will be described. In the first embodiment, PDL data is converted into intermediate data by builder processing, and then intermediate data is held. In the second embodiment, PDL data is held, and intermediate data for analysis and that for printing are generated. In the third embodiment, not intermediate data and PDL data but bitmap data is held.

Figure 12:
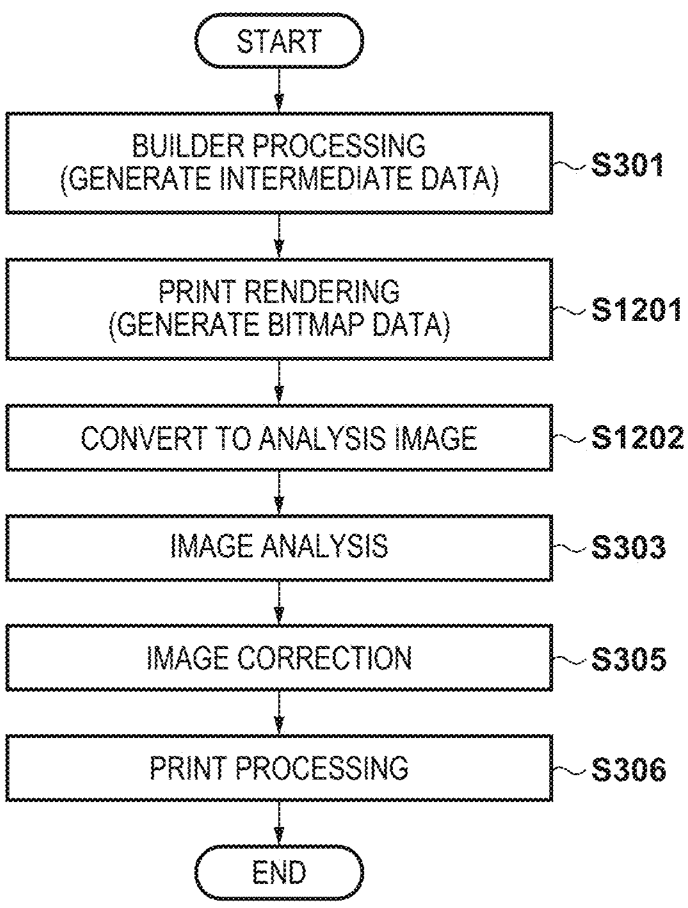
FIG. 12 is a flowchart for explaining overall processing of an image processing apparatus according to the third embodiment.

FIG. 12 is a flowchart for explaining overall processing of an image processing apparatus according to the third embodiment. Note that in the third embodiment, differences from the first and second embodiments will be described.

In step S1201, a CPU 204 performs rendering based on intermediate data. The rendering resolution is a print resolution (600 dpi) higher than an analysis resolution (150 dpi). The CPU 204 may delete PDL data at the end of step S301, or may delete the intermediate data as well at the end of step S1201. The CPU 204 holds bitmap data (to be referred to as print image data hereinafter) of 600 dpi in a bitmap data area 222.

In step S1202, the CPU 204 executes image reduction for analysis processing based on the print image data. The resolution of analysis image data is 150 dpi.

Figure 13:
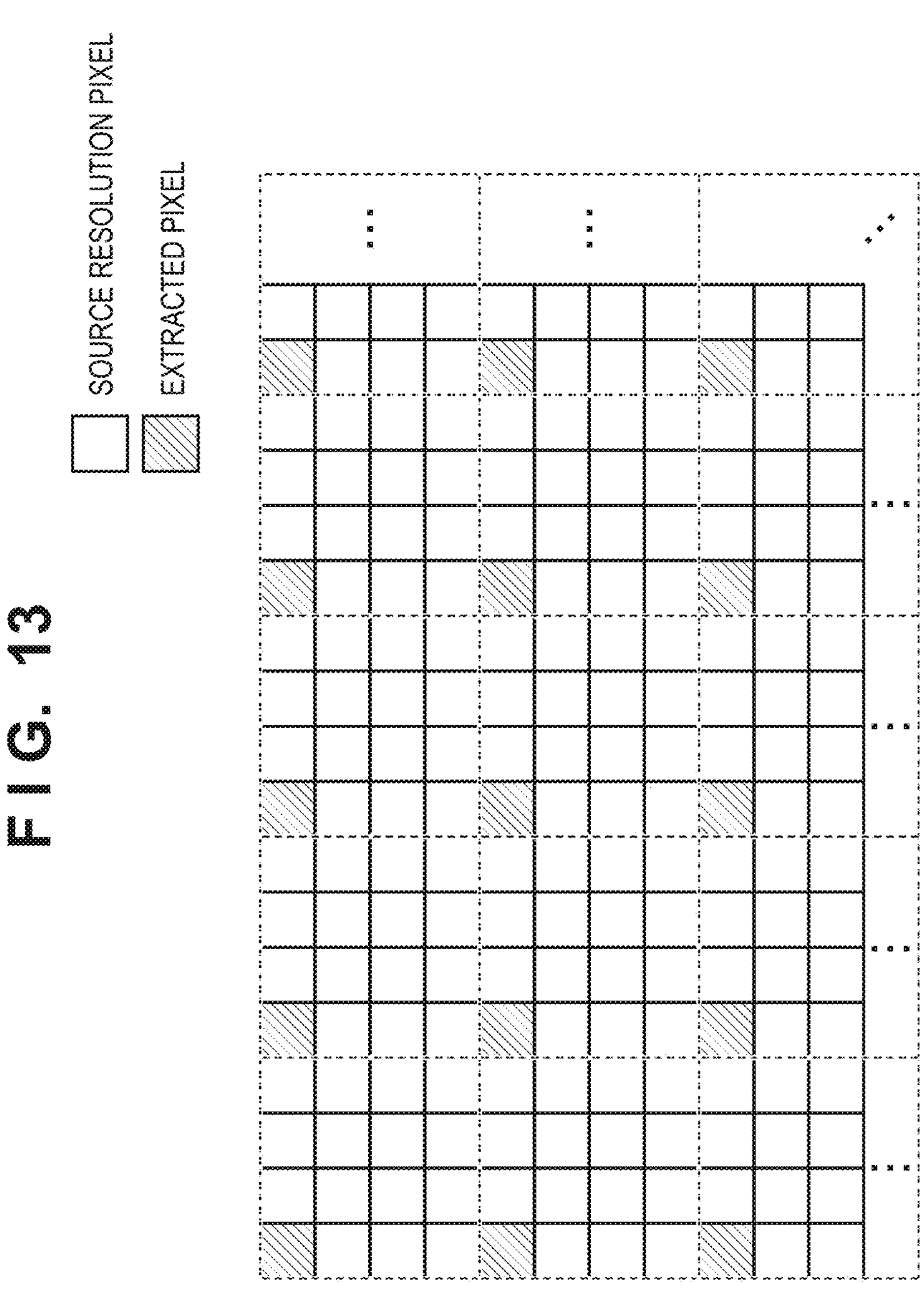
FIG. 13 is a view for explaining an example of print image data reduction processing according to the third embodiment.

FIG. 13 is a view for explaining an example of print image data reduction processing according to the third embodiment.

The CPU 204 extracts one pixel from every 4×4 pixels of the print image data of 600 dpi in FIG. 13, thereby generating analysis image data of 150 dpi. Note that the reduction method is not limited to the method of extracting pixels. For example, instead of extracting pixels, the average value of 4×4 pixels may be output as an output value to reduce the print image data. Although extraction processing has an advantage that the processing speed is high, the reduction method is appropriately decided based on a target processing speed requested for reduced image generation processing and adaptability based on the contents of analysis to be executed by analysis processing. If the reduction method uses extraction processing, it may be impossible to obtain the feature of the original image (print image data). For example, if white and black are repeated at a specific frequency as the content of the original image, the extraction result may contain only white or black depending on the frequency and phase of the extraction interval. When performing global area discrimination as a part of analysis processing, the feature of an area of the original image can be held by executing average value reduction and outputting an intermediate value between white and black.

On the other hand, also usable is a means for outputting a pixel maximum value and a pixel minimum value in 4×4 pixels of the print image data. If the pixel maximum value is used, white (255 in 8 bits) is output preferentially as compared to black (0 in 8 bits). If the purpose is to extract only a solid area with a size not less than 4×4 pixels without extracting an area of dots/lines in the original image (bitmap data of 600 dpi) at the time of output, the means using the pixel maximum value is effective. For example, when switching the threshold matrix of quantization by analysis, the quantization algorithm can readily design graininess and density for a solid area, and therefore, only a solid area should be the switching target.

If the pixel minimum value is used, black is output preferentially as compared to white. Like the average value, this method is effective when performing global area discrimination, and as a characteristic feature, the pixel value at the time of input is not changed as compared to the average value. For example, when analyzing what color an area is formed from, a pixel reduced value is preferably output instead of using the method in which a reduced pixel value varies by averaging processing.

The CPU 204 holds, on a recording medium, the analysis image data obtained by reducing the print image data. The CPU 204 maintains a state in which the print image data is also held on the recording medium. Note that if the analysis image data can be generated by extraction processing as in this method, when acquiring, from the recording medium, a pixel value to be used for analysis processing in step S303, processing of skip-reading the print image data can alternatively be used. Return to the explanation of FIG. 12.

In step S305, the CPU 204 uses the print image data of 600 dpi. As described above, in the third embodiment, the print image data after rendering is held in the memory. At the time of image analysis, analysis image data obtained by enlarging/reducing the print image data to a resolution necessary for analysis is used. In printing, the analysis image data is corrected. As compared to the first embodiment, the third embodiment has an effect of suppressing the processing load because rendering processing is not executed twice. As compared to the second embodiment, the third embodiment has an effect of suppressing the processing load because builder processing and rendering are not executed twice.

Fourth Embodiment

The intermediate data according to the first embodiment is generated as the result of builder processing by the CPU 204, and the intermediate data is data generated based on PDL data, as described above. Also, as described above, the intermediate data changes to bitmap data by rendering processing of the renderer unit 211. In the fourth embodiment, "fallback processing" that is performed in a case where the capacity of a RAM 205 when generating intermediate data is short will be described.

<Fallback Processing During Rendering Processing>

Fallback processing will be described below. When generating intermediate data, if the capacity of the intermediate data exceeds a predetermined data capacity, or if it is determined that the work area of the RAM 205 for processing intermediate data exceeds a predetermined data capacity, the generated intermediate data is rendered, thereby generating bitmap data. Then, the intermediate data created so far is deleted. The bitmap data is used as the background image of a drawing area, and the background image is compressed to reduce the capacity of the RAM 205. The series of processes described above is fallback processing.

After that, when intermediate data of one page is generated, the compressed background image is expanded and converted into bitmap data, and remaining intermediate data of one page is also rendered to bitmap data. Finally, bitmap data of one page is generated.

Normally, since the above-described background image is compressed, the capacity of the added intermediate data is smaller than the capacity of the original intermediate data. Hence, if the remaining intermediate data is generated in a free area generated by compressing the background image, intermediate data of a large size can be processed in the limited area of the RAM 205.

<Flowchart in Fallback Processing>

FIG. 14 is a flowchart for explaining a case where fallback processing occurs in builder processing according to the fourth embodiment.

In step S2001, the CPU 204 acquires PDL data from a PDL area 220 if builder processing is started in step S301 in FIG. 3. The CPU 204 then inspects the PDL data and generates a plurality of drawing commands such that bitmap data can be generated from the top of the page. One set of drawing commands is called a "drawing command group". Data including the drawing command group is intermediate data.

In step S2002, the CPU 204 generates drawing commands one by one from the PDL data.

In step S2003, the CPU 204 calculates the free space of an intermediate data area 221.

In step S2004, the CPU 204 compares a capacity to store the drawing commands generated in step S2002 with the free space calculated in step S2003, and determines whether the drawing commands can be saved in the intermediate data area 221. Upon determining that the drawing commands can be saved in the intermediate data area 221 (YES in step S2004), the CPU 204 advances the process to step S2009. On the other hand, upon determining that the drawing commands cannot be saved in the intermediate data area 221 (NO in step S2004), the CPU 204 advances the process to step S2005. Since the intermediate data area 221 has a sufficient free space in the first drawing command generation, a case where the drawing commands are saved in the intermediate data area 221 will be described first.

In step S2009, the CPU 204 saves the drawing command group in the intermediate data area 221. At this time, if a drawing command of the same page exists, the CPU 204 adds the newly generated drawing commands such that these can be arranged next to the preceding drawing command, and arranges these as the drawing command group.

In step S2010, the CPU 204 determines whether generation of intermediate data of one page is completed. Upon determining that generation of intermediate data of one page is completed (YES in step S2010), the CPU 204 ends the builder processing and deletes the PDL data from the PDL area 220. On the other hand, upon determining that generation of intermediate data of one page is not completed (NO in step S2010), the CPU 204 returns the process to step S2002 and generates a subsequent drawing command.

A case where generation of intermediate data of one page is not completed will continuously be described. The processes of steps S2002 and S2003 are executed again. Upon determining in step S2004 that there is no free space in the intermediate data area 221, or there is little free space, the CPU 204 advances the process to step S2005. A case where the process advances to step S2005 is often a case where a command with a large capacity is generated, for example, image data is embedded in the generated drawing command.

In step S2005, the CPU 204 instructs a renderer unit 211 to generate bitmap data using the intermediate data. Based on the bitmap data generation instruction, the renderer unit 211 performs rendering using the drawing command group in the intermediate data area 221 and the drawing command newly generated in step S2002, and writes bitmap data in a bitmap data area 222. The bitmap data is a "background image".

In step S2006, the CPU 204 instructs a JPEG encoder 215 to JPEG-compress the bitmap data (background image) generated in step S2005 to generate compressed data of the background image.

In step S2007, the CPU 204 deletes various kinds of data used to generate the background image. More specifically, the various kinds of data include the drawing command group and the drawing command used in step S2005 and the bitmap data generated in step S2005. The capacity of the background image generated in step S2007 is smaller than the capacity of the drawing command group and the drawing command used in step S2005. It is therefore possible to, by deleting various kinds of data, newly ensure the capacity for the drawing command that cannot be saved in the intermediate data area 221. If the capacity of the background image is larger than the capacity of the drawing command group and the drawing command used in step S2005, or the capacity of the background image is larger than a predetermined capacity, the compression rate to be used in step S2006 may be raised, and the compression processing may be executed again. Note that although various kinds of data are "deleted" as described above, it is only necessary to set the area of unnecessary data as a free area, and therefore, zero data need not be overwritten on the area of unnecessary data.

In step S2008, the CPU 204 saves, in the intermediate data area 221, the background image generated in step S2007, and advances the process to step S2010. A case where the CPU 204 determines in step S2010 that generation of intermediate data is not completed, and the process advances to step S2002 will be described.

The processes of steps S2002 and S2003 are executed again. Upon determining in step S2004 that the intermediate data area 221 has a free space, the CPU 204 advances the process to step S2009. At this time, since the background image exists in the intermediate data area 221, the drawing command is arranged not to overwrite the background image. Then, the above-described processing is repeated until generation of the intermediate data is completed, or drawing commands cannot be saved in the intermediate data area 221 anymore.

A case where the CPU 204 determines again in step S2004 that the drawing command cannot be saved in the intermediate data area 221, and advances the process to step S2005 will be described.

In step S2005, the CPU 204 instructs the renderer unit 211 to generate bitmap data using the intermediate data. Based on the instruction from the CPU 204, the renderer unit 211 performs rendering using the drawing command group in the intermediate data area 221 and the drawing command newly generated in step S2002, and writes bitmap data in the bitmap data area 222. At this time, the background image is decoded by a JPEG decoder 216. If rendering can be performed for the decoded background image, the decoding instruction target may be the CPU 204 or the renderer unit 211.

Subsequently, the process of step S2006 is executed. In step S2007, since there is more old background image to be deleted, the drawing command group, the drawing command, and the background image used in step S2005 and the bitmap data generated in step S2005 are deleted. In step S2008, the background image generated in step S2007 is saved in the intermediate data area 221 again. After that, the process advances to step S2010, and if it is determined that intermediate data generation processing is not completed yet, the processing described above is performed.

As described above, if fallback processing occurs, the finally generated background image and the drawing command group that is not deleted are saved as intermediate data in the intermediate data area 221.

The process of step S302 (image analysis rendering) according to the fourth embodiment will be described. In the first embodiment, intermediate data is "read out", as described above. If fallback processing occurs, not only the drawing command group but also the compressed background image is included in the intermediate data. For this reason, the CPU 204 causes the renderer unit 211 to execute image analysis rendering using the drawing command group and the compressed background image in the intermediate data area 221. At this time, the background image is decoded by the JPEG decoder 216. If rendering can be performed for the decoded background image, the decoding instruction target may be the CPU 204 or the renderer unit 211.

The process of step S304 (print rendering) according to the fourth embodiment will be described. In the first embodiment, intermediate data is "read out", as described above. If fallback processing occurs, not only the drawing command group but also the compressed background image is included in the intermediate data. For this reason, the CPU 204 causes the renderer unit 211 to execute image analysis rendering using the drawing command group and the compressed background image in the intermediate data area 221. At this time, the background image is decoded by the JPEG decoder 216. If rendering can be performed for the decoded background image, the decoding instruction target may be the CPU 204 or the renderer unit 211. Also, as in the first embodiment, if rendering processing is completely ended, the CPU 204 can delete the intermediate data from the intermediate data area 221 at this point of time.

<Description of Intermediate Data in Fallback Processing>

FIG. 15 is a view for explaining the contents of intermediate data in each state in the processing shown in FIG. 14.

The abscissa of a table 2100 indicates the states (state 1 to state 5) of intermediate data. Intermediate data indicates a drawing command group and a background image. The table 2100 shows how the drawing command group and the background image in the intermediate data are generated and deleted. What kind of intermediate data is stored in the intermediate data area 221 in each state will be described below.

State 1 is a state in which a first drawing command group is generated when the intermediate data area 221 has a free space in first step S2004 in FIG. 14, and the first drawing command group is stored in the intermediate data area 221. In the intermediate data area 221, no background image exists as intermediate data, but the first drawing command group that is a set of a plurality of drawing commands exists.

State 2 is a state in which while maintaining state 1, rendering processing for fallback is executed when the intermediate data area 221 has no free space in next step S2004, and the compressed background image (first background image) is stored in the intermediate data area 221. Note that since the first background image is generated, the first drawing command group is deleted from the intermediate data area 221.

State 3 is a state in which while maintaining state 2, a second drawing command group is generated when the intermediate data area 221 has a free space in next step S2004, and the second drawing command group is stored in the intermediate data area 221. For this reason, the first background image and the second drawing command group exist in the intermediate data area 221.

State 4 is a state in which while maintaining state 3, rendering processing for fallback is executed when no free space exists in next step S2004, and the compressed background image (second background image) is stored in the intermediate data area 221. Note that since the second background image is generated, the first background image and the second drawing command group are deleted from the intermediate data area 221.

State 5 is a state in which while maintaining state 4, a third drawing command group is generated when a free space exists in step S2004, and the third drawing command group is stored in the intermediate data area 221. For this reason, the second background image and the third drawing command group exist in the intermediate data area 221. If intermediate data is completed in state 5, the CPU 204 performs image analysis rendering and print rendering using the intermediate data in state 5.

As described above, in the fourth embodiment, if the capacity when generating intermediate data in builder processing increases, and fallback processing occurs, intermediate data including a drawing command and a background image is generated. Hence, in this fourth embodiment, image analysis rendering, print rendering, and image correction can be performed, as in the first embodiment, independently of the contents of PDL data.

Other Embodiments

In the first to fourth embodiments, analysis processing for selecting a mapping table and correction processing individually using a color design table have been described as an example. The present invention provides the effect in the system constituting image analysis processing and correction processing, but is not limited to image analysis processing and correction processing. For example, analysis processing for discriminating a solid area and areas other than that in an original image may be executed, and a threshold matrix of quantization may be switched in accordance with the analysis result. When determining a solid area, the pixel maximum value is selected in the reduction method in image reduction, thereby simply removing dots and lines, as described using FIG. 13. In the removing means in reduction, the size of the reduction window is limited. However, in analysis for a reduced image, a solid area can be determined in a wider area. As the threshold matrix, it is possible to select a matrix in which dots are discretely arranged in a solid area, and the graininess and the density at the time of input are held. For a non-solid area, a matrix in which dots are concentratedly arranged with priority on the shape over graininess can be selected.

In the above-described embodiments, the serial-type image processing apparatus 100 has been described. However, the present invention is not limited to this if the characteristic and configuration are the same. The image processing apparatus 100 may use a line head, or may include serial-type heads arranged in the longitudinal direction.

Also, in the above-described embodiments, the image processing apparatus has been described as an inkjet printer. However, the present invention is not limited to this if the characteristic and configuration are the same. For example, the image processing apparatus may be a laser printer using toner or a copying machine.

In the above-described embodiments, the description language has simply been referred to as PDL. However, if the PDL can generate intermediate data in builder processing, PostScript and PDF may be used, or PDL unique to a printer maker may be used.

In the above-described embodiments, the image processing unit 207 has been described as a hardware processing unit including the renderer unit 211, the analysis unit 212, and the like. However, if the processing of each flowchart described in the embodiments can be implemented, some processes in the image processing unit 207 may be executed by the CPU 204. For example, the processing of the renderer unit 211 and the analysis unit 212 may be software processing by the CPU 204.

In the above-described embodiments, the PDL area 220, the intermediate data area 221, the bitmap data area 222, and the correction data area 223 are arranged in the RAM 205. However, the present invention is not limited to the RAM 205 if it is a rewritable storage device. For example, an HDD different from the RAM 205 and an eMMC may wholly or partially hold the PDL area 220 to the correction data area 223.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-086426, filed May 25, 2023 which is hereby incorporated by reference herein in its entirety.

What is claimed is:

1. An image processing apparatus comprising:

at least one processor; and at least one memory coupled to the at least one processor, the at least one memory storing instructions that, when executed by the at least one processor, cause the at least one processor to:

generate first bitmap data and second bitmap data different from the first bitmap data based on PDL data;

acquire, based on an analysis result of the first bitmap data, a gamut mapping table that associates the second bitmap data with a print color gamut;

correct the second bitmap data based on the gamut mapping table;

generate quantized image data based on the corrected second bitmap data; and hold generated intermediate data, wherein the at least one processor generates the intermediate data based on the PDL data, and generates the first bitmap data and the second bitmap data based on the held intermediate data; and wherein if the at least one processor holds a first intermediate data group that is a part of the intermediate data, and a capacity of a second intermediate data group that the at least one processor receives after the first intermediate data group exceeds a free space, the at least one processor generates a first background image based on the first intermediate data group and the second intermediate data group, and deletes the first intermediate data group and holds the first background image.

2. The apparatus according to claim 1, wherein a resolution of the first bitmap data is lower than a resolution of the second bitmap data.

3. The apparatus according to claim 1, wherein the gamut mapping table includes a perceptual mapping table and a colorimetric mapping table.

4. The apparatus according to claim 1, wherein after the at least one processor acquires the gamut mapping table, the at least one processor deletes the first bitmap data and corrects the second bitmap data based on the gamut mapping table.

5. The apparatus according to claim 1, wherein the instructions, when executed by the at least one processor, further cause the at least one processor to hold the PDL data, wherein the at least one processor generates the intermediate data based on the PDL data held, and generates the first bitmap data and the second bitmap data based on the generated intermediate data.

6. The apparatus according to claim 1, wherein if a capacity of a third intermediate data group received after the second intermediate data group does not exceed the free space, the at least one processor holds the first background image and the third intermediate data group.

7. The apparatus according to claim 6, wherein if a capacity of a fourth intermediate data group that the at least one processor receives after the third intermediate data group exceeds the free space, the at least one processor generates a second background image different from the first background image based on the third intermediate data group and the fourth intermediate data group, and deletes the first background image and the third intermediate data group and holds the second background image.

8. The apparatus according to claim 1, wherein the at least one processor generates the first bitmap data and the second bitmap data based on a final holding result.

9. The apparatus according to claim 7, wherein the instructions, when executed by the at least one processor, further cause the at least one processor to:

perform image compression processing for the first background image and the second background image; and decode the first background image and the second background image, which have undergone the image compression processing.

10. The apparatus according to claim 1, wherein the at least one processor generates the first bitmap data by rendering based on the intermediate data, and generates the second bitmap data by predetermined image processing using the generated first bitmap data.

11. The apparatus according to claim 10, wherein the predetermined image processing is processing of reducing a size of the second bitmap data.

12. An image processing method comprising:

generating first bitmap data and second bitmap data different from the first bitmap data based on PDL data;

acquiring, based on an analysis result of the first bitmap data, a gamut mapping table that associates the second bitmap data with a print color gamut;

correcting the second bitmap data based on the gamut mapping table;

generating quantized image data based on the corrected second bitmap data; and holding generated intermediate data, wherein the intermediate data is generated based on the PDL data, and the first bitmap data and the second bitmap data are generated based on the held intermediate data, and wherein if a first intermediate data group that is a part of the intermediate data is held, and a capacity of a second intermediate data group that is received after the first intermediate data group exceeds a free space, a first background image is generated based on the first intermediate data group and the second intermediate data group, and the first intermediate data group is deleted and the first background image is held.

13. A non-transitory computer-readable storage medium storing instructions that, when executed by a computer, cause the computer to perform a method comprising:

generating first bitmap data and second bitmap data different from the first bitmap data based on PDL data;

acquiring, based on an analysis result of the first bitmap data, a gamut mapping table that associates the second bitmap data with a print color gamut;

correcting the second bitmap data based on the gamut mapping table;

generating quantized image data based on the corrected second bitmap data; and holding generated intermediate data, wherein the intermediate data is generated based on the PDL data, and the first bitmap data and the second bitmap data are generated based on the held intermediate data; and wherein if a first intermediate data group that is a part of the intermediate data is held, and a capacity of a second intermediate data group that is received after the first intermediate data group exceeds a free space, a first background image is generated based on the first intermediate data group and the second intermediate data group, and the first intermediate data group is deleted and the first background image is held.

* * * * *